United States Patent

Randell et al.

[11] 4,033,928
[45] July 5, 1977

[54] STABILIZED EPOXY RESINS

[75] Inventors: Donald Richard Randell, Stockport; Barry Cook, Manchester; Alexander Michael Chalmers, Cheadle, all of England

[73] Assignee: Ciba-Geigy Corporation, Ardsley, N.Y.

[22] Filed: Apr. 1, 1975

[21] Appl. No.: 564,185

[30] Foreign Application Priority Data

Apr. 11, 1974  United Kingdom ............ 16127/74

[52] U.S. Cl. ................ 260/45.8 N; 260/45.8 NE; 260/45.8 NZ
[51] Int. Cl.² .......................................... C08K 5/00
[58] Field of Search ............ 260/45.8 NE, 45.8 NZ, 260/45.75 K

[56] References Cited

UNITED STATES PATENTS

| | | | |
|---|---|---|---|
| 3,234,155 | 2/1966 | Dearborn et al. | 260/45.8 N |
| 3,703,496 | 11/1972 | Hodan et al. | 260/45.8 N |

FOREIGN PATENTS OR APPLICATIONS

| | | |
|---|---|---|
| 1,284,069 | 8/1972 | United Kingdom |
| 1,394,770 | 5/1975 | United Kingdom |
| 1,398,064 | 6/1975 | United Kingdom |

Primary Examiner—Melvyn I. Marquis
Assistant Examiner—William E. Parker
Attorney, Agent, or Firm—Nestor W. Shust

[57] ABSTRACT

Epoxy resins stabilized by at least one sterically hindered cyclic amine of the formula I

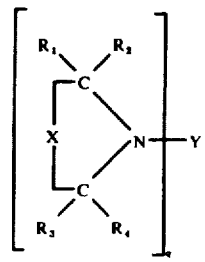

and salts thereof in which $q$ is 1 or 2, X represents an organic grouping which complements the nitrogen-containing ring to give a 5-membered, 6-membered or 7-membered ring, $R_1$ and $R_2$ represent methyl or together represent $-(CH_2)_5-$, $R_3$ represents methyl, $R_4$ represents alkyl with 1–5 carbon atoms or together with $R_3$ represents the radicals $-(CH_2)_4-$, $-(CH_2)_5-$, $-CH_2-C(CH_3)_2-NH-C(CH_3)_2-CH_2-$ or $-CH_2-C(CH_3)_2-N(O\cdot)-C(CH_3)_2-CH_2-$ and, if $q$ is 1, Y denotes hydrogen, $-O\cdot$, hydroxyl, alkyl, substituted alkyl, alkenyl, alkynyl, aralkyl, substituted aralkyl or acyl or, if $q$ is 2, Y denotes alkylene, alkenylene, alkynylene, cycloalkylene or aralkylene.

9 Claims, No Drawings

STABILIZED EPOXY RESINS

The present invention relates to new stabilised epoxy resins the stabiliser being a sterically hindered cyclic amine.

Epoxy resins, that are polyepoxide compounds, are increasingly employed in numerous fields of use because of their well-balanced mechanical properties and their excellent processing properties. They are also being used increasingly for external applications.

However, an obstacle to the general and broad application of these resins is their inadequate light stability. Epoxy resins are deteriorated under outdoor exposure. This deterioration causes a decrease of the mechanical properties of the resin as well as discoloration. A sufficient light stabilisation of epoxy resins is an unsolved problem of today.

It has now been found that epoxy resins can effectively be stabilised by the addition of a sterically hindered cyclic amine.

Thus, the invention relates to epoxy resins stabilised by at least one sterically hindered cyclic amine of the formula I

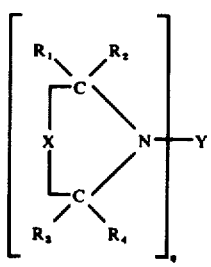
(I)

and salts thereof in which $q$ is 1 or 2, X represents an organic grouping which complements the nitrogen-containing ring to give a 5-membered, 6-membered or 7-membered ring, $R_1$ and $R_2$ represent methyl or together represent $-(CH_2)_5-$, $R_3$ represents methyl, $R_4$ represents alkyl with 1-5 carbon atoms or together with $R_3$ represents the radicals $-(CH_2)_4-$, $-(CH_2)_5-$, $-CH_2-C(CH_3)_2-NH-C(CH_3)_2-CH_2-$ or $-CH_2-C(CH_3)_2-N(O\cdot)-C(CH_3)_2-CH_2-$ and, if $q$ is 1, Y denotes hydrogen, $-O\cdot$, hydroxyl, alkyl, substituted alkyl, alkenyl, alkynyl, aralkyl, substituted aralkyl or acyl or, if $q$ is 2, Y denotes alkylene, alkenylene, alkynylene, cycloalkylene or aralkylene.

By the above sterically hindered cyclic amine the weathering resistance of epoxide resins is improved in an unexpectedly lasting manner.

Examples of sterically hindered cyclic amines of the formula I which are suitable for the stabilised system according to the invention, correspond to the following formulae:

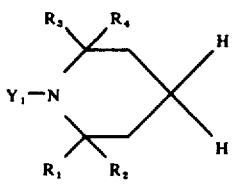
II

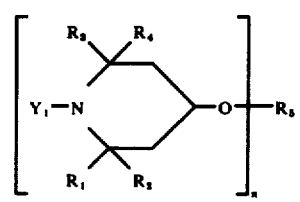
III

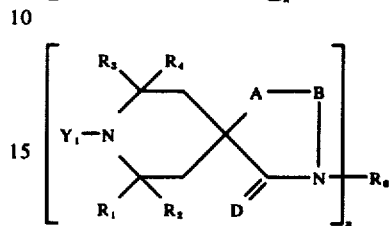
IV

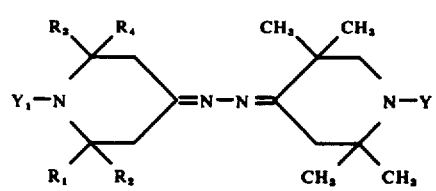
V

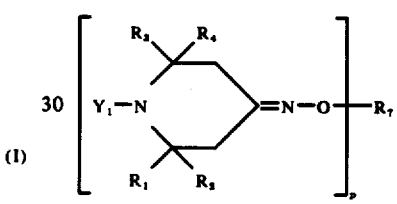
VI

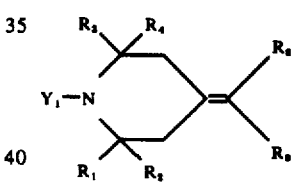
VII

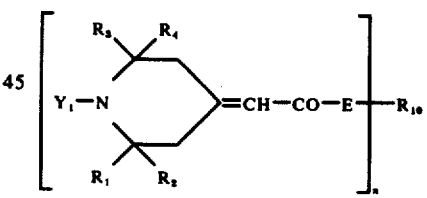
VIII

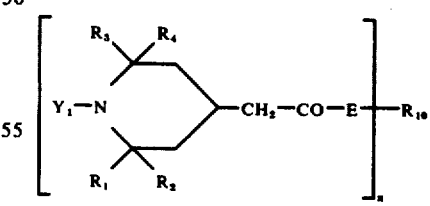
IX

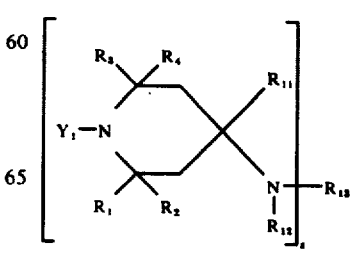
X

-continued

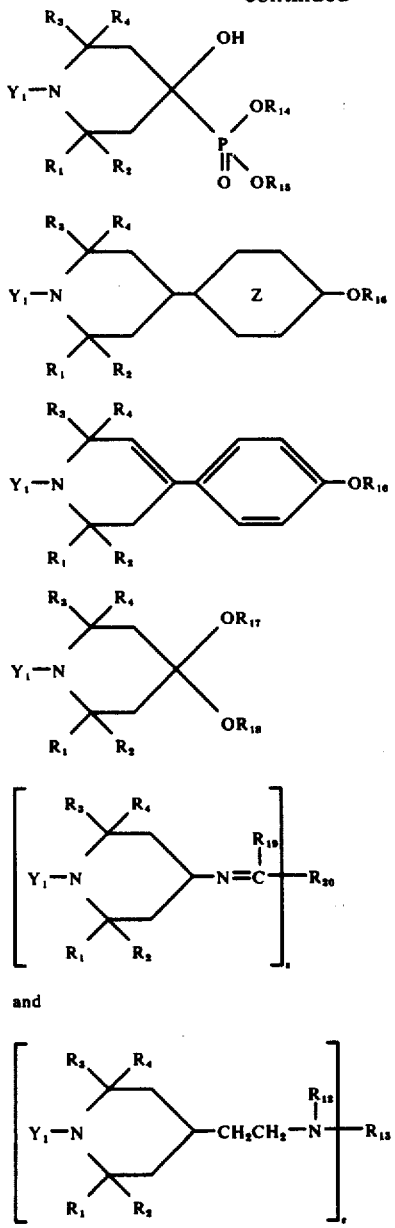

and

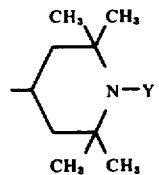

in which formulae Y₁ represents hydrogen, —O·, hydroxyl, alkyl, substituted alkyl, alkenyl, alkinyl, aralkyl, substituted aralkyl or acyl, R₁ and R₂ represent methyl or together represent —(CH₂)₅—, R₃ represents methyl, R₄ represents alkyl with 1–5 carbon atoms or together with R₃ represents the radicals —(CH₂)₄—, —(CH₂)₅—, —CH₂—C(CH₃)₂—NH—C(CH₃-)₂—CH₂— or —CH₂—C(CH₃)₂—N(O·)—C(CH₃-)₂—CH₂—, s represents 1, 2 or 3, p represents 1 to 3, n represents 1 to 4, R₅ represents hydrogen, a saturated or unsaturated, unsubstituted or substituted aliphatic, cycloaliphatic or araliphatic radical, an unsubstituted or substituted aromatic radical, a monovalent to tetravalent acyl radical which is derived from an aliphatic, cycloaliphatic, araliphatic, aromatic or heterocyclic monobasic or polybasic carboxylic acid, from a carbonic acid or from a monobasic or polybasic phosphoric, sulphuric, boric or silicic acid, an s-triazinyl radical or a group of the formula R₆ represents hydrogen, a saturated or unsaturated, unsubstituted or substituted aliphatic, cycloaliphatic or araliphatic radical, a substituted or unsubstituted aromatic radical, or a monoacyl radical derived from a monobasic carboxylic acid or carbonic acid, A represents oxygen or =N—R₂₄, wherein R₂₄ is hydrogen, alkyl, substituted alkyl, alkenyl, alkinyl or aralkyl, B represents > C=O, > C=S, alkylidene, substituted alkylidene or aralkylidene, D represents oxygen, sulphur or NH, R₇ represents hydrogen, alkyl, aralkyl or a monoacyl, diacyl or triacyl radical derived from a monobasic to tribasic carboxylic acid, or a carbonic acid radical, R₈ and R₉ independently of one another represent alkoxycarbonyl, acyl, nitrile or phenyl, R₁₀ represents a saturated or unsaturated, unsubstituted or substituted, aliphatic, cycloaliphatic or araliphatic radical, an unsubstituted or substituted aromatic radical or a group of the formula XVII, E represents oxygen, sulphur or >N—R₂₅, wherein R₂₅ is hydrogen, alkyl, cycloalkyl or aralkyl, R₁₁ represents hydrogen or alkyl, R₁₂ represents hydrogen, alkyl, cycloalkyl or aralkyl, R₁₃ represents hydrogen, a saturated or unsaturated, unsubstituted or substituted aliphatic, cycloaliphatic or araliphatic radical, an unsubstituted or substituted aromatic radical, a monovalent or divalent acyl radical derived from an aliphatic, cycloaliphatic, araliphatic, aromatic or heterocyclic monobasic or dibasic carboxylic acid, from a carbonic acid or from a monobasic or polybasic phosphoric acid or sulphuric acid, an s-triazinyl radical, a radical of the formula XVII or, together with R₁₂, an alkylene radical which can be interrupted by hetero-atoms, R₁₄ and R₁₅ independently of one another represent alkyl, cycloalkyl or aralkyl or together represent alkylene, R₁₆ represents hydrogen or acyl, with the ring Z representing a benzene or cyclohexane ring which is unsubstituted or substituted by 1–3 alkyl, cycloalkyl or aralkyl groups, R₁₇ and R₁₈ represent the same alkyl group or together represent unsubstituted or substituted 1,2-ethylene, 1,3-propylene, 1,2-phenylene or a group of the formula R₁₉ represents hydrogen, alkyl, alkenyl, aralkyl, aryl or substituted aryl and R₂₀ represents unsubstituted or substituted alkyl, alkenyl, aralkyl, unsubstituted or substituted aryl, or a heterocyclic radical, or R₁₉ and R₂₀ together represent cycloalkylidene, or correspond to one of the following formulae:

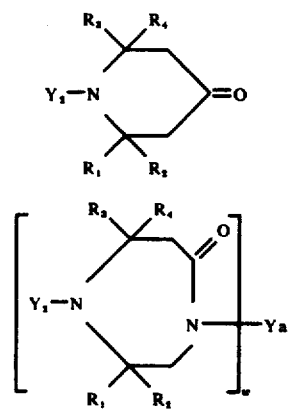

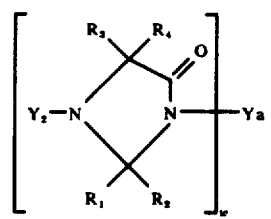

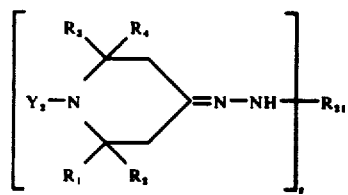

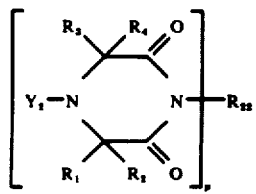

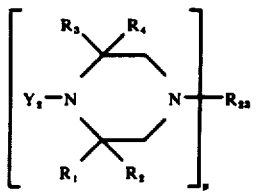

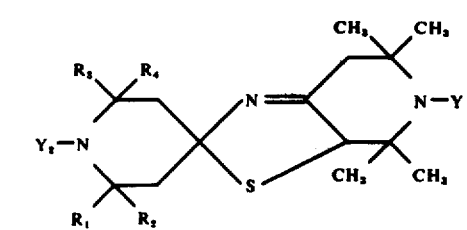

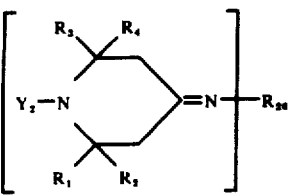

XIX

XX

XXI

XXII

XXIII

XXIV

XXV

XXVI

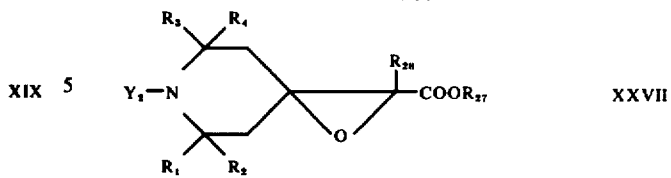

XXVII in which formulae $Y_2$ denotes hydrogen, —O· or methyl, $s$, $p$, $R_1$, $R_2$, $R_3$ and $R_4$ denote what has been mentioned above, $R_{21}$ denotes a monovalent or divalent acyl radical derived from a monobasic or dibasic carboxylic acid or carbonic acid, $R_{22}$ denotes hydrogen, alkyl, alkoxycarbonylalkyl, aralkyl, alkylene, aralkylene or arenetriyl-tris-alkyl, $R_{23}$ denotes the same as $R_{22}$ or denotes a monoacyl or diacyl radical or —$(CH_2)_{1-12}$—COOMe, Me being hydrogen or $Me^z$ $1/z$ and Me being a dialkyl tin residue or a metal residue and $z$ being 1–4 and the valence of that residue Me, $R_{26}$ denotes alkyl, cycloalkyl, aralkyl, aryl, arylamino, alkylene, cycloalkylene or arylene, $R_{27}$ denotes alkyl and $R_{28}$ denotes hydrogen or alkyl with 1–5 carbon atoms, or correspond to the formula

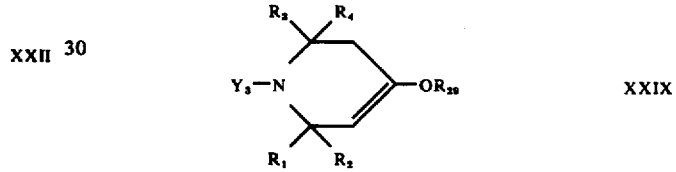

XXIX wherein $R_1$, $R_2$, $R_3$ and $R_4$ have the abovementioned meaning, $Y_3$ represents hydrogen or methyl and $R_{29}$ represents alkyl, cycloalkyl or aralkyl, Ya is for $w$ being 1 alkyl, substituted alkyl, alkenyl, alkinyl, aralkyl or substituted aralkyl, Ya is for $w$ being 2 alkylene, interrupted alkylene, alkenylene, alkinylene or bis-alkylene arene, Ya is for $w$ being 3 $T[OOC—(CH_2)_x—]_3$ with $x$ being 1–4 and T being a trivalent hydrocarbon residue, or Ya is for $w$ being 4 $Q[OOC—(CH_2)_x—]_4$ with $x$ being 1–4 and Q being a tetravalent hydrocarbon residue, or in a compound XX Ya is —CO—$X_{xx}$—$R_{xx}$, $X_{xx}$ being O or NH and $R_{xx}$ being a hydrocarbyl residue having from 1–20 C-atoms and $w$ is 1 or 2 or corresponds to the formula

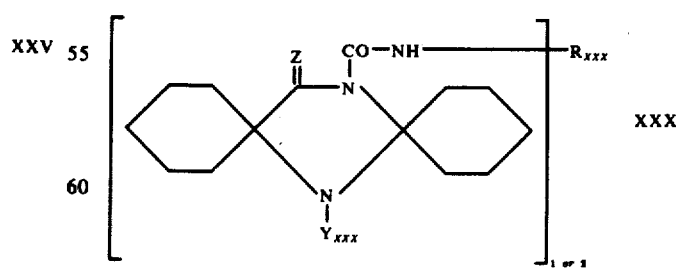

XXX as well as salts thereof, wherein $Y_{xxx}$ is O·, hydrogen or alkyl with 1–4 carbon atoms, $R_{xxx}$ is optionally substituted hydrocarbyl residue with 1–20 carbon atoms and Z is S or preferably O, or corresponds to the formula

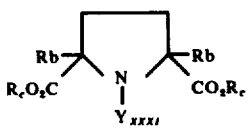

XXXI wherein $Y_{XXXI}$ is hydrogen, hydroxy, O·, alkyl, alkenyl, alkinyl or alkoxyalkyl, $R_b$ is alkyl and $R_c$ is alkyl or phenethyl, or corresponds to the formula

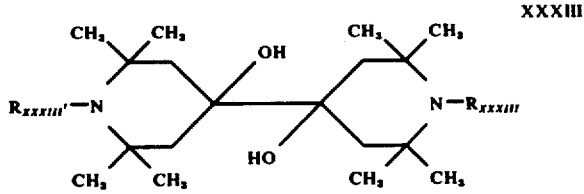

XXXIII $R_{XXXIII}$ and $R_{XXXIII'}$ being same or different and each hydrogen, alkyl, alkenyl, alkinyl, aralkyl, hydroxyalkyl, alkoxyalkyl, aliphatic or aromatic acyloxyalkyl, cyanoalkyl, halogenoalkyl, epoxyalkyl, alkoxycarbonylalkyl, aliphatic acyl, alkoxycarbonyl or aralkoxycarbonyl, or corresponds to the formula

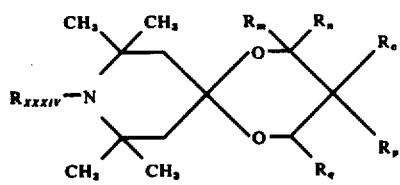

XXXIV $R_{XXXIV}$ being same as $R_{XXXIII}$ and $R_m$, $R_n$, $R_o$, $R_p$ and $R_q$ being same or different and hydrogen or alkyl.

As s-triazinyl radical can be substituted by halogen, alkylamino, alkylthio or a group of formula VXII.

Preferably, in the formulae given for sterically hindered cyclic amines as defined above $Y_1$ denotes hydrogen, —O·, alkyl with 1-8 carbon atoms, halogenoalkyl with 1-5 carbon atoms, cyanoalkyl with 1-5 carbon atoms, epoxyalkyl with 3-4 carbon atoms, hydroxyaralkyl with 8-12 carbon atoms, acyloxyalkyl with 4-20 carbon atoms, aminoalkyl with 2-4 carbon atoms, acylamino with 2-18 carbon atoms, alkoxycarbonylalkyl with 3-21 carbon atoms, alkoxyalkyl with 3-20 carbon atoms, aralkyl with 7-20 carbon atoms, alkenyl with 3-6 carbon atoms or alkinyl with 3-6 carbon atoms, $R_1$ and $R_2$ denote methyl, $R_3$ and $R_4$ denote methyl or together denote —(CH$_2$)$_5$ or —CH$_2$—C(CH$_3$)$_2$—NH—C(CH$_3$)$_2$—CH$_2$—, s denotes 1, p denotes 1, n denotes 1 or 2, $R_5$ denotes hydrogen, alkyl with 1-12 carbon atoms, alkenyl with 3-4 carbon atoms, cycloalkyl with 6-8 carbon atoms, aralkyl with 7-9 carbon atoms, aryl with 6-10 carbon atoms, an acyl group which is derived from an aliphatic carboxylic acid with 1-20 carbon atoms, from an unsaturated carboxylic acid with 3-12 carbon atoms, from a cycloaliphatic carboxylic acid with 7-12 carbon atoms, from an araliphatic carboxylic acid with 8-12 carbon atoms, from a hydroxyphenylalkylcarboxylic acid with 9-16 carbon atoms, from an aliphatic carboxylic acid with 3-21 carbon atoms of which the carbon chain is interrupted by sulphur or oxygen, from an aromatic carboxylic acid with 7-12 carbon atoms, from a hydroxyphenylcarboxylic acid with 7-15 carbon atoms, from carbonic acid, from an aliphatic dicarboxylic acid with 2-20 carbon atoms, from an aliphatic dicarboxylic acid 4-8 carbon atoms of which the chain is interrupted by oxygen or sulphur, from an aromatic dicarboxylic acid with 8-12 carbon atoms or from a carbamic or thiocarbamic acid which is substituted at the nitrogen by alkyl with 1-18 carbon atoms, cycloalkyl with 6-8 carbon atoms, aralkyl with 7-9 carbon atoms or aryl with 6-10 carbon atoms, $R_6$ denotes hydrogen, alkyl with 1-20 carbon atoms, alkenyl with 3-6 carbon atoms, alkinyl with 3-6 carbon atoms, cycloalkyl with 6-8 carbon atoms, alkylcycloalkyl with 7-10 carbon atoms, aralkyl with 7-12 carbon atoms, aryl with 6-10 carbon atoms, alkylphenyl with 7-10 carbon atoms, epoxyalkyl with 3-5 carbon atoms, halogenoalkyl with 1-5 carbon atoms, hydroxyalkyl with 2-5 carbon atoms, alkoxyalkyl with 3-20 carbon atoms, alkoxycarbonylalkyl with 3-21 carbon atoms, acyloxyalkyl with 4-21 carbon atoms, alkylene with 4-8 carbon atoms, 3-oxapentamethylene, 3-thiapentamethylene, phenylene, alkylphenylene or p-xylylene, A denotes > NH or > N—$R_{24}$, wherein $R_{24}$ denotes hydrogen, alkyl with 1-6 carbon atoms, glycidyl, alkenyl with 3-4 carbon atoms, alkinyl with 3-4 carbon atoms or aralkyl with 7-9 carbon atoms, B denotes > C=O, > C=S or alkylidene with 5-18 carbon atoms, D denotes oxygen or > NH, $R_7$ denotes hydrogen, alkyl with 1-8 carbon atoms, aralkyl with 7-9 carbon atoms, an acyl group which is derived from an aliphatic carboxylic acid with 2-12 carbon atoms, from benzoic acid or from a carbamic acid which is substituted at the nitrogen by alkyl with 1-18 carbon atoms, benzyl or phenyl, $R_8$ and $R_9$ independently of one another denote alkoxycarbonyl with 2-6 carbon atoms, benzoyl, nitrile or phenyl, $R_{10}$ denotes alkyl with 1-18 carbon atoms, cycloalkyl with 6-8 carbon atoms, aralkyl with 7-12 carbon atoms, aryl with 6-10 carbon atoms, alkylene with 2-18 carbon atoms, aralkylene with 8-12 carbon atoms, arylene with 6-12 carbon atoms, 2,2,6,6-tetramethylpiperidinyl-4 or 1,2,2,6,6-pentamethylpiperidinyl-4, E denotes oxygen, sulphur or > N—$R_{25}$, wherein $R_{25}$ is hydrogen, alkyl with 1-12 carbon atoms, cyclohexyl or benzyl, $R_{11}$ denotes hydrogen or alkyl with 1-12 carbon atoms, $R_{12}$ denotes hydrogen, alkyl with 1-8 carbon atoms, cyclohexyl or benzyl, $R_{13}$ denotes hydrogen, alkyl with 1-8 carbon atoms, alkenyl with 3-4 carbon atoms, cycloalkyl with 6-8 carbon atoms, aralkyl with 7-9 carbon atoms, phenyl, alkylphenyl with 7-12 carbon atoms, or an acyl group which is derived from an aliphatic monocarboxylic acid with 1-20 carbon atoms, from an unsaturated carboxylic acid with 3-12 carbon atoms, from an aliphatic carboxylic acid with 3-21 carbon atoms which is substituted by alkoxy or alkylthio groups, from an aromatic carboxylic acid with 7-10 carbon atoms or from a carbamic or thiocarbamic acid which is substituted at the nitrogen by alkyl with 1-18 carbon atoms, cycloalkyl with 6-8 carbon atoms, aralkyl with 7-9 carbon atoms or aryl with 6-12 carbon atoms, $R_{14}$ and $R_{15}$ denote alkyl with 1-12 carbon atoms, cyclohexyl, benzyl, halogenoalkyl with 2-5 carbon atoms or, together, ethylene or 1,2-propylene, $R_{16}$ denotes hydrogen or the radical of an acyl group which is derived from an aliphatic carboxylic acid with 2-18 carbon atoms, from an aromatic carboxylic acid with 7-10 carbon atoms or from a carbamic acid substituted at the nitrogen by alkyl with 1-12 carbon atoms, benzyl or phenyl, with the ring Z representing a benzene or cyclohexane ring which is not substituted further or is substituted further by 1–2 alkyl groups with 1–5 carbon atoms, $R_{17}$ and $R_{18}$ denote alkyl with 1–8 carbon atoms, alkylene with 2–5 carbon atoms, 1,2-phenylene or a group of the formula

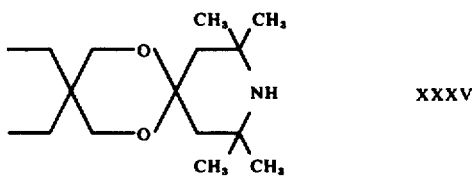   XXXV $R_{19}$ denotes hydrogen, alkyl with 1–4 carbon atoms, alkenyl with 3–4 carbon atoms, benzyl or phenyl, $R_{20}$ denotes alkyl with 1–12 carbon atoms, alkenyl with 3–4 carbon atoms, aralkyl with 7–9 carbon atoms, aryl with 6–10 carbon atoms, alkoxyaryl with 7–9 carbon atoms, furyl, thienyl or, together with $R_{19}$, —$(CH_2)_5$—, $R_{21}$ denotes an acyl group which is derived from an aliphatic carboxylic acid with 1–20 carbon atoms, from an aliphatic carboxylic acid with 3–20 carbon atoms of which the chain is interrupted by oxygen or sulphur atoms, from a cycloaliphatic carboxylic acid with 7–12 carbon atoms, from an araliphatic carboxylic acid with 8–12 carbon atoms, from an hydroxyaraliphatic monocarboxylic acid with 9–16 carbon atoms, from an aromatic carboxylic acid with 7–15 carbon atoms or from a hydroxybenzoic acid with 7–15 carbon atoms, $R_{22}$ denotes hydrogen, alkyl with 1–20 carbon atoms, benzyl, alkylene with 1–20 carbon atoms or alkoxycarbonylalkyl with 2–26 carbon atoms, $R_{23}$ denotes the same as $R_{22}$ or denotes an acyl group which is derived from an aliphatic carboxylic acid with 2–20 carbon atoms, from benzoic acid or from a carbamic acid substituted at the nitrogen by alkyl with 1–24 carbon atoms or phenyl, $R_{26}$ denotes alkyl with 1–16 carbon atoms, cycloalkyl with 6–8 carbon atoms, aralkyl with 7–12 carbon atoms, aryl with 6–10 carbon atoms or arylamino with 6–10 carbon atoms, $R_{27}$ denotes alkyl with 1–8 carbon atoms, $R_{28}$ denotes hydrogen or methyl, $R_{29}$ denotes alkyl with 1–18 carbon atoms, cycloalkyl with 5–6 carbon atoms or aralkyl with 7–12 carbon atoms. In a compound of formula III $R_5$ is also a residue —O—CO—$R_x$—CO—OMe, Me being as above hydrogen or $Me^z$ 1/z and z being 1–4 and the valence of the metal residue Me, and $R_x$ is alkylene, oxa-alkylene or thiaalkylene.

In a compound of formula X $R_{13}$ is also a residue —NH—CO—$R_x$—CO—OMe, Me being as above hydrogen or $Me^z$ 1/z and z being 1–4 and the valence of the metal residue Me, and $R_x$ is alkylene, oxa-alkylene or thioalkylene.

$Y_1$ is above all hydrogen, —O·, alkyl with 1–8 C atoms or alkenyl with 2–7 C atoms, especially hydrogen, O·, methyl or allyl.

Particularly preferentially, in the formulae given for sterically hindered cyclic amines and in the formulae II–VIII, $Y_1$ denotes hydrogen, —O· or methyl, $R_1$, $R_2$, $R_3$ and $R_4$ denote methyl, s denotes 1, p denotes 1, n denotes 1 or 2, $R_5$ denotes hydrogen, or an acyl group which is derived from an aliphatic carboxylic acid with 1–18 carbon atoms, from acrylic acid or methacrylic acid, from benzoic acid or from an alkylbenzoic acid with 8–11 carbon atoms, from salicylic acid, from an aliphatic dicarboxylic acid with 4–14 carbon atoms, from terephthalic acid, from isophthalic acid or from a carbamic or thiocarbamic acid which is substituted at the nitrogen by alkyl with 1–12 carbon atoms, benzyl or phenyl, $R_6$ denotes alkyl with 1–12 carbon atoms, allyl, benzyl, cyclohexyl, glycidyl, hydroxyethyl, alkoxyalkyl with 3–10 carbon atoms, alkoxycarbonylalkyl with 3–14 carbon atoms, hexamethylene or 3-oxapentamethylene, A denotes >NH or >N—$R_{24}$ is hydrogen, methyl, ethyl or benzyl, B denotes >C=O, D denotes oxygen, $R_7$ denotes hydrogen, methyl, benzyl, benzoyl or phenylcarbamoyl, $R_8$ denotes nitrile, $R_9$ denotes ethoxycarbonyl, phenyl or benzoyl, $R_{10}$ denotes alkyl with 6–8 carbon atoms, cyclohexyl, benzyl, alkylene with 4–12 carbon atoms, xylylene, phenylene or 2,2,6,6-tetramethyl-piperidinyl-4–4, E denotes oxygen or >NH, $R_{11}$ denotes hydrogen, $R_{12}$ denotes hydrogen or methyl, $R_{13}$ hydrogen or an acyl group which is derived from an aliphatic carboxylic acid with 1–18 carbon atoms, from acrylic or methacrylic acid, from a benzoic acid with 7–10 carbon atoms, from salicylic acid or from a carbamic or thiocarbamic acid which is substituted at the nitrogen by alkyl with 1–12 carbon atoms, benzyl or phenyl, $R_{14}$ and $R_{15}$ denote alkyl with 4–8 carbon atoms, benzyl or chloroethyl, $R_{16}$ denotes hydrogen or the radical of an acyl group which is derived from an aliphatic carboxylic acid with 2–12 carbon atoms, from benzoic acid or from a N-alkyl-carbamic acid with 2–8 carbon atoms, with the ring Z representing a benzene ring which is substituted further by 1–2 methyl, isopropyl or tert.-butyl groups, $R_{17}$ and $R_{18}$ denote methyl, ethylene, 1,3-propylene or a group of the formula XXXV, $R_{19}$ denotes hydrogen, $R_{20}$ denotes alkyl with 1–8 carbon atoms, benzyl, phenyl, alkoxyphenyl with 7–10 carbon atoms, or together with $R_{19}$, —$(CH_2)_5$—, $R_{21}$ denotes an acyl group which is derived from an aliphatic monocarboxylic acid 3–18 carbon atoms of which the chain can be interrupted by sulphur atoms, from phenylacetic acid, from benzoic acid or from salicylic acid, $R_{22}$ denotes hydrogen, alkyl with 6–18 carbon atoms or benzyl, $R_{23}$ denotes the same as $R_{22}$ or an acyl group which is derived from an aliphatic carboxylic with 3–18 carbon atoms, from benzoic acid or from a carbamic acid which is substituted at the nitrogen by alkyl with 1–12 carbon atoms or phenyl, $R_{24}$ denotes hydrogen, methyl, ethyl or benzyl, $R_{26}$ denotes alkyl with 4–18 carbon atoms, benzyl or phenyl, $R_{27}$ denotes alkyl with 4–4 carbon atoms, $R_{28}$ denotes hydrogen, $R_{29}$ denotes alkyl with 4–18 carbon atoms or benzyl.

If Y, $Y_1$, $R_4$, $R_5$, $R_6$, $R_7$, $R_{10}$, $R_{11}$, $R_{12}$, $R_{13}$, $R_{14}$, $R_{17}$, $R_{18}$, $R_{19}$, $R_{20}$, $R_{22}$, $R_{23}$, $R_{24}$, $R_{25}$, $R_{26}$, $R_{27}$, $R_{28}$, $R_{29}$, Ya, $R_{xx}$, $Y_{xxx}$, $R_{xxx}$, $Y_{xxxi}$, $R_d$ and $R_f$, $R_{xxxiii}$, $R_{xxxiii'}$, $R_m$, $R_n$, $R_o$, $R_p$ and $R_q$ denote alkyl, then this is, for example, within the scope of the indicated limits, methyl, ehtyl, ehtyl, propyl, butyl, pentyl, hexyl, octyl, decyl, dodecyl, tetradecyl, octadecyl, eicosyl, iso-propyl, iso-butyl, tert.-butyl, iso-pentyl, tert.-amyl, iso-octyl or tert.-octyl.

If Y, $Y_1$, $R_5$, $R_6$, $R_{13}$, $R_{19}$, $R_{20}$, Ya, $R_{xx}$, $R_{xxx}$, $Y_{xxxi}$, $R_{xxxiii}$, $R_{xxxiii'}$ and $R_{xxxiv}$, denote alkenyl and/or alkinyl, this is, for example, within the scope of the indicated limits, allyl, methallyl, 3-hexenyl, 4octenyl, 10-undecenyl, propargyl, but-1-inyl, but-2-inyl or 1-hexinyl.

If Y, $Y_1$, $R_5$, $R_6$, $R_7$, $R_{10}$, $R_{12}$, $R_{13}$, $R_{14}$, $R_{15}$, $R_{19}$, $R_{20}$, $R_{22}$, $R_{23}$, $R_{24}$, $R_{25}$, $R_{26}$, $R_{29}$, Ya, $R_{xx}$, $Y_{xxx}$, $R_{xxxiii}$, $R_{xxxiii'}$ and $R_{xxxiv}$ denote aralkyl or hydroxyaralkyl, this is, for example, within the scope of the indicated limits, benzyl, α-methylbenzyl, α,α-dimethylbenzyl, naphthyl-1-methyl or 2-hydroxy-2-phenylethyl.

If $R_5$, $R_6$, $R_{10}$, $R_{12}$, $R_{13}$, $R_{14}$, $R_{15}$, $R_{25}$, $R_{26}$ and $R_{29}$, denote cycloalkyl or alkylcycloalkyl, this is, for example, cyclohexyl, cyclooctyl, 4-methylcyclohexyl or 4-tert.-butylcyclohexyl.

If $Y_1$, $R_6$, $R_{14}$, $R_{15}$, $R_{xxxiii}$, $R_{xxxiii'}$ and $R_{xxxiv}$ denote halogenalkyl, this is, for example 2-chloroethyl, 2-bromoethyl, 2-chloropropyl, 3-bromopropyl, 4-chlorobutyl or 2-chloro-2-phenylethyl.

If $Y_1$, $R_{xxxiii}$, $R_{xxxiii'}$ and $R_{xxxiv}$ denotes cyanoalkyl, this is, for example, 2-cyanoethyl, 2-cyanopropyl, 3-cyanopropyl or 4-cyanopentyl.

If $Y_1$, $R_6$, $R_{xxxiii}$, $R_{xxxiii'}$ and $R_{xxxiv}$ denote epoxyalkyl, this is, for example, glycidyl, 2,3-epoxy-3-methylpropyl, 3,4-epoxy-n-butyl or 4,5-epoxy-n-pentyl.

If $Y_1$, $R_6$, $R_{xxxiii}$, $R_{xxxiii'}$ and $R_{xxxiv}$ denote hydroxyalkyl, this is, for example, 2-hydroxyethyl, 2-hydroxypropyl, 3-hydroxypropyl, 2-hydroxybutyl or 4-hydroxypentyl.

If $Y_1$, $R_6$, $R_{xxxiii}$, $R_{xxxiii'}$ and $R_{xxxiv}$ denote alkoxyalkyl, this is, for example, 2-methoxy-ethyl, 2-ethoxyethyl, 2-propoxyethyl, 3-methoxypropyl, 2-butoxyethyl, 4-methoxypentyl, 2-octoxyethyl, 2-dodecyloxyethyl or 2-octadecyloxyethyl.

If $Y_1$ among others are acyloxyalkyl, this is e.g. 2-acetoxyethyl, 2-acetoxypropyl, 3-acetoxypropyl, 4-propionyloxybutyl, 2-(methylcarbamoyloxy)ethyl, 2-(ethylcarbamoyloxy)ethyl, 2-(phenylcarbamoyloxy)ethyl, 2-(alkylthiocarbamoyloxy)ethyl, 4-propionyloxy-pentyl or 2-octadecanoyloxyethyl.

If $Y_1$ denotes aminoalkyl, this is, for example, 2-aminoethyl, 2-dimethylaminoethyl, 3-dimethylaminopropyl or 2-octylaminoethyl.

If Y, $R_6$, $R_{22}$ and others are alkoxycarbonylalkyl, this is, for example, within the scope of the indicated limits, 2-methoxycarbonylethyl, 2-ethoxycarbonylethyl, 2butoxycarbonylethyl, hexyloxycarbonylmethyl, methoxycarbonylpropyl, 2-dodecyloxycarbonylethyl, 2-octadecyloxycarbonylethyl or 2-eicosyloxycarbonylethyl.

If $R_5$, $R_6$, $R_{10}$ and others denote aryl, this is, for example, within the scope of the indicated limits, phenyl or naphthyl.

If $R_5$ and $R_{13}$ denote alkylphenyl, this is for example, within the scope of the indicated limits, tolyl, 2,4-xylyl, 2,6-xylyl, 4-tert.-butylphenyl, 4tert.-octylphenyl, methylnaphthyl or dimethylnaphthyl.

If Y, $R_6$, $R_{10}$, $R_{17}$, $R_{18}$ and others denote alkylene, this is, for example, within the scope of the indicated limits, methylene, ethylene, propylene, butylene, hexamethylene, octamethylene, dodecamethylene or octadecamethylene.

If $R_{10}$ and $R_{22}$ denote aralkylene, this is, for example, within the scope of the indicated limits, p-xylylene, 1,4-bis-(ethylene)phenylene or dimethyl-p-xylylene.

If B denotes alkylidene, this is, for example, within the scope of the indicated limits, 2-pentylidene, 1-hexylidene, 1-octylidene, 1-dodecylidene or 1-octadecylidene.

If $R_{10}$ denotes alkanetriyl or alkanetetrayl, this is, for example, within the scope of the indicated limits, one of the radicals of the formulae XXXVI

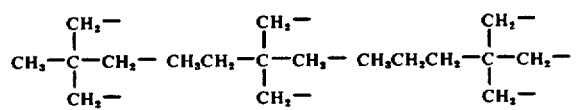

XXXVI

-continued

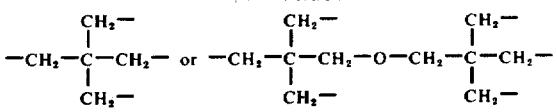

If $R_6$, $R_{10}$ and $R_{26}$ denote arylene, this is, for example, within the scope of the indicated limits, 1,2-phenylene, 1,3-phenylene, 1,4-phenylene, 1,4-naphthylene, 1,5-naphthylene, 2,6-naphthylene, dimethylphenylene or dimethylnaphthylene.

If $R_{22}$ denotes alkylene-bis-(oxycarbonylalkyl), this is, for example, within the scope of the indicated limits, ethylene-bis-(oxycarbonylmethyl), ethylene-bis-(oxycarbonylethyl), 1,2-propylene-bis-(oxycarbonylethyl), 1,4-tetramethylene-bis-(oxycarbonylpropyl) or 1,6-hexamethylene-bis-(oxycarbonylethyl).

If Y, $Y_1$, $R_5$, $R_7$, $R_{13}$, $R_{16}$ and others denote an acyl group which is derived from an aliphatic, unsaturated cycloaliphatic or araliphatic carboxylic acid or from an aliphatic or aromatic carboxylic acid interrupted by sulphur or oxygen, this is, for example, within the scope of the indicated limits, formyl, acetyl, propionyl, butyroyl, hexanoyl, heptanoyl, octanoyl, 2-ethylhexanoyl, 2,2,4-trimethylpentanoyl, decanoyl, dodecanoyl, tetradecanoyl, hexadecanoyl, octadecanoyl, eicosoyl, acryloyl, methacryloyl, crotonoyl, 10-undecenoyl, 9-octadecenoyl, phenylacetyl, β-phenylpropionyl, β-trimethylphenyl-propionyl (4-hydroxy-3,5-di-tert.-butyl-phenyl)acetyl, β-(4-hydroxy-3,5-di-tert.-butylphenyl)propionyl, β-(3-tert.-butyl-4-hydroxy-5-methyl-phenyl)propionyl, cyclohexanecarbonyl,4-tert.-butyl-cyclohexanoyl, β-methylthiopropionyl, methylthioacetyl, β-octylthiopropionyl, β-dodecylthiopropionyl, β-octadecylthiopropionyl, butylthioacetyl, octylthioacetyl, cinnamoyl, benzoyl, o-, m-or p-toluoyl, m-chlorobenzoyl, p-tert.-butylbenzoyl, 3,5-di-tert.-butyl-4-hydroxybenzoyl or 2,4-dimethylbenzoyl.

If $R_5$, $R_7$, $R_{13}$, $R_{16}$, $R_{21}$ and others denote an acyl group which is derived from an aliphatic dicarboxylic acid of which the chain can be interrupted by oxygen or sulphur, or is derived from an aromatic dicarboxylic acid, this is, for example, within the scope of the indicated limits, the divalent radical of oxalic, malonic, succinic, glutaric, adipic, pimelic, suberic, azelaic or sebacic acid, 1,12-dodecanedicarboxylic acid or 1,18-octadecanedicarboxylic acid, thiodiacetic acid, thiodipropionic acid, oxydipropionic acid, phthalic acid, isophthalic acid, terephthalic acid, dimethylterephthalic acid, tetrahydrophthalic acid or hexahydrophthalic acid.

If $R_5$, $R_7$, $R_{13}$, $R_{16}$ and $R_{23}$ denote the radical of a carbamic acid or thiocarbamic acid, this is, for example, within the scope of the indicated limits, carbamoyl, N-methyl-, N-ethyl-, N-propyl-, N-isopropyl-, N-butyl-, N-pentyl-, N-octyl-, N-decyl-, N-dodecyl-, N-octadecyl-, N-allyl-, N-methallyl-, N-undecenyl-, N-cyclohexyl-, N-methylcyclohexyl-, N-benzyl-, N-(β-phenethyl)-, N-phenyl-, N-o-tolyl-, N-p-tolyl-, N-2,4-xylyl-, N,N-dimethyl-, N-methyl-N-ethyl-, N,N-diethyl-, N,N-diisopropyl- or N,N-di-n-butyl-carbamoyl or the corresponding thiocarbamoyl radicals.

If $R_{23}$ denotes the radical of an alkylene- or arylene-bis-carbamic acid, this is, for example, within the scope of the indicated limits, ethylene-bis-carbamoyl, hexamethylene-bis-carbamoyl, 1,4-phenylene-bis-carbamoyl or tolylene-bis-carbamoyl. If $R_5$ denotes an s-triazinyl radical, this is, for example, within the scope of the indicated limits, the s-triazinyl group itself, 1-chloro-s-triazinyl, 1,3-dichloro-s-triazinyl, 1-ethylamino-s-triazinyl, 1-isopropylamino-s-triazinyl and 1,3-dimethylthio-s-triazinyl radicals.

If $R_8$, $R_9$ and others denote alkoxycarbonyl, this is, for example, within the scope of the indicated limits, methoxy-, ethoxy-, propoxy-, butoxy-, iso-butoxy-, pentyloxy-, hexyloxy-, octoxy- or dodecyloxy-carbonyl.

If any of the above radicals denotes alkoxy, this is, for example, within the scope of the indicated limits, methoxy, ethoxy, propoxy, butoxy, β-methoxyethoxy, pentyloxy, iso-butyloxy, octoxy, dodexyloxy, tetradecyloxy, octadecyloxy or eicosyloxy.

Furthermore, acyloxy is, for example, within the scope of the indicated limits, acetoxy, propionyloxy, butyroyloxy, 2-ethylhexanoyloxy or lauroyloxy.

If $R_{26}$ denotes arylamino, this is, for example, within the scope of the indicated limits, phenylamino, p-tolylamino or p-tert.-butylphenylamino.

If Y and others denote acylamino, this is, for example, within the scope of the indicated limits, acetyl-, propionyl-, butyroyl-, pentanoyl-, 2-ethylhexanoyl-, lauroyl-, stearoyl-, phenylacetyl-, acryloyl-, methacryloyl- or cyclohexylcarbonyl-amino.

Examples of compounds of the formula I are:
I. 1. 4-Benzoyloxy-,
I. 2. 4-Salicyloyloxy-,
I. 3. 4-Capryloyloxy-,
I. 4. 4-Stearoyloxy-,
I. 5. 4-(β-3,5-di-tert.-butyl-4-hydroxyphenyl-propionyloxy)- and
I. 6. 4-(3,5-di-tert.-butyl-4-hydroxybenzoyloxy)-2,2,6,6-tetramethylpiperidine,
I. 7. 4-Benzoyloxy-,
I. 8. 4-Salicyloyloxy-,
I. 9. 4-Stearoyloxy- and
I. 10. 4-tert.-butylbenzoyloxy-1,2,2,6,6-pentamethylpiperidine.
I. 11. Bis-(2,2,6,6-tetramethyl-4-piperidyl)-sebacate.
I. 12. Bis-(2,2,6,6-tetramethyl-4-piperidyl)-suberate.
I. 13. Bis-(2,2,6,6-tetramethyl-4-piperidyl)-dodecanedioate.
I. 14. Bis-(1,2,2,6,6-pentamethyl-4-piperidyl)-sebacate.
I. 15. 4-Capryloyloxy-1-propyl-2,2,6,6-tetramethylpiperidine.
I. 16. 4-Capryloyloxy-1-allyl-2,2,6,6-tetramethylpiperidine.
I. 17. 4-Benzoylamido-,
I. 18. 4-Acryloyamido- and
I. 19. 4-Stearoylamido-2,2,6,6-tetramethylpiperidine.
I. 20. N,N'-Bis(2,2,6,6-tetramethyl-4-piperidyl)oxalamide.
I. 21. N-(2,2,6,6-Tetramethyl-4-piperidyl)cyclohexanoneimine.
I. 22. (2,2,6,6-Tetramethylpiperidin-4-one)-azine.
I. 23. 3-n-Butyl-,
I. 24. 3-n-Butyl-8-methyl-,
I. 25. 3-n-Octyl-,
I. 26. 3-n-Octyl-8-methyl-,
I. 27. 3-Allyl-,
I. 28. 3-Allyl-8-methyl-,
I. 29. 3-Glycidyl-,
I. 30. 3-Glycidyl-8-methyl-,
I. 31. 3-Octadecyl-,
I. 32. 3-Cyclohexyl-,
I. 33. 1,3,8-Trimethyl-,
I. 34. 1,8-Dimethyl-3-hexamethylene-bis-,
I. 35. 1,8-Dimethyl-3-(3-oxapentamethylene-bis)-,
I. 36. 8-Methyl- and
I. 37. 3-n-Octyl-8-benzyl-7,7,9,9-tetramethyl-1,3,8-triazaspirol[4.5]decane-2,4-dione.
I. 38. 1,3,8-Triaza-2-n-undecyl-4-oxo-7,7,9,9-tetramethylspiro[4.5]decane.
I. 39. 2,4,6-Tris-(2,2,6,6-tetramethyl-4-piperidyloxy)-s-triazine.
I. 40. 2,4,6-Tris-(1,2,2,6,6-pentamethyl-4piperidyloxy)-s-triazine.
I. 41. 2,4,6-Tris-(2,2,6,6-tetramethyl-4-piperidylamino)-s-triazine.
I. 42. 2,2,6,6-Tetramethyl-4-β-cyanoethoxy-piperidine.
I. 43. 1,2,2,6,6-Pentamethyl-4-lauroyloxy-piperidine.
I. 44. Triacetone-amine-oxime.
I. 45. Ethyl (2,2,6,6-tetramethylpiperidinylidene-4)-acetate.
I. 46. (2,2,6,6-Tetramethylpiperidinyl-4-)acetic acid octadecyl ester.
I. 47. Ethyl (1,2,2,6,6-pentamethylpiperidinyl-4)-acetate.
I. 48. 2,2,6,6-Tetramethyl-4-hydroxy-(2,2,6,6-tetramethylpiperidinyl-4-acetate).
I. 49. N,N'-Bis-(2,2,6,6-tetramethylpiperidinyl-4-acetyl)ethylenediamine.
I. 50. 2,2,6,6-Tetramethy-4-(β-capryloylaminoethyl)piperidine.
I. 51. N,N'-Bis-[β-(2,2,6,6-tetramethylpiperidinyl-4)-ethyl]oxalamide.
I. 52. 2,6-Dimethyl-4-(2,2,6,6-tetramethylpiperidinyl-4)phenol.
I. 53. Bis-(2,2,6,6-tetramethylpiperidinyl-4)-adipoyl-dihydrazone.
I. 54. 2,2,6,6-Tetramethylpiperidinyl-4-capryloyl-hydrazone.
I. 55. 2,2,7,7-Tetramethyl-hexahydro-5H-1,4-diazepin-5-one.
I. 56. 5,5,7,7-Tetramethylpiperidino-[5.4-C]-Δ$_3$-thiazoline-2-spiro-4'-(2', 2', 6', 6'-tetramethylpiperidine).
I. 57. Cylclohexane-1spiro-2'-(4'-oxoimidazoline)-5'-spiro-1''-cyclohexane.
I. 58. 7,15-Diazadispiro[5,1,5,3]hexadecane.
I. 59. 4-n-Octadecyl-2,2,6,6-tetramethyl-3,5-diketopiperazine.
I. 60. 15,15'-Sebacoyl-bis(7,15-diazadispiro[5,1,5,3-]hexadecane).
I. 61. 1-n-Octyl-,
I. 62. 1-n-Dodecyl-,
63. 1-β-Stearoyloxyethyl- and
I. 64. 1-n-Octoxycarbonylmethyl-2,2,6,6-tetramethylpiperidine.
I. 65. 2,2,6,6-Tetramethyl-4-benzoylpiperidin-1-oxyl.
I. 66. Bis-(2,2,6,6-tetramethyl-4-piperidinyl-1-oxyl)-
I. 67. 7,14-Diaza-15-oxo-dispiro[5.1.5.2]pentadecan.
I. 68. 1,3,5-Tris(1,2,2,6,6-pentamethyl-4-piperidinylamino)-s-triazine,
I. 69. 1-Chloro-3,5-bis(2,2,6,6-tetramethyl-4-piperidinylamino)-s-triazine,
I. 70. 1-Chloro-3,5-bis(2,2,6,6-tetramethyl-piperidinyloxy)-s-triazine,
I. 71. N-cyclohexyl-(2,2,6,6-tetramethylpiperidinyl-4-)acetamide,
I. 72. N-cyclohexyl-(1,2,2,6,6-pentamethylpiperidinyl-4)acetamide.

Preferred are amine stabilisers of formula II, III, IV, IX, X, XIV, XIX, XX, XXI, XXIII, XXIV, XXVII, XXX, XXXI, XXXII, XXXIII and XXXIV, and of these especially II, III, IV, XIV, XIX, XX, XXI, XXXIII and XXXIV.

Especially preferred are sterically hindered cyclic amines of the formula

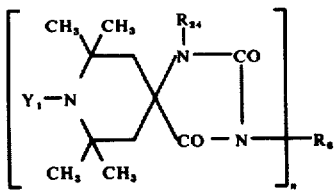 XXXVII in which $Y_1$ denotes hydrogen, $-O\cdot$ or methyl, $R_6$ denotes alkyl with 1–12 carbon atoms, allyl, benzyl, cyclohexyl, glycidyl, hydroxyethyl, alkoxyalkyl with 3–10 carbon atoms, alkoxycarbonylalkyl with 3–14 carbon atoms, hexamethylene or 3-oxapentamethylene, $R_{24}$ denotes hydrogen, methyl, ethyl or benzyl, and $n$ denotes 1 or 2, or of the formula

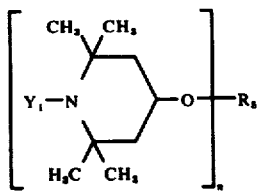 XXXVIII in which $Y_1$ denotes hydrogen, $-O\cdot$ or methyl, $R_5$ denotes an acyl group which is derived from an aliphatic carboxylic acid with 1–18 carbon atoms, from acrylic acid or methacrylic acid, from a benzoic acid with 7–11 carbon atoms, from salicylic acid, from an aliphatic dicarboxylic acid with 6–14 carbon atoms, from terephthalic acid, from isophthalic acid, from $\beta$-(3,5-di-tert.-butyl-4-hydroxyphenyl)-propionic acid or from 3,5-di-tert.-butyl-4-hydroxy-benzoic acid and $n$ denotes 1 or 2. $R_5$ also denotes an s-triazinyl radical which has a chlorine substituent and $n$ is 2.

The new stablised systems according to the invention make it possible effectively to protect epoxide polymers, against the harmful influence of UV radiation, heat and oxygen, without discolouration.

In principle, all classes of epoxide compounds, provided that they contain more than one epoxide group in the molecule, are suitable for the invention.

Suitable polyepoxide compounds are, in particular, such compounds having on average more than one glycidyl group or $\beta$-methylglycidyl group bound to a hetero atom (e.g. sulphur, preferably oxygen or nitrogen); special mention may be made of di- or polyglycidyl ethers of polyvalent aliphatic alcohols such as 1,4-butanediol, or polyalkylene glycols such as polypropylene glycols; di- or polyglycidyl ethers of cycloaliphatic polyols such as 2,2-bis-(4'-hydroxycyclohexyl)-propane; di- or polyglycidyl ethers of polyvalent phenols such as resorcin, bis-(p-hydroxyphenyl)-methane, 2,2-bis-(p-hydroxyphenyl)propane (= diomethane), 2,2-bis-(4'-hydroxy-3',5'-dibromophenyl)-propane, 1,1,2,2-tetrakis-(p-hydroxyphenyl)ethane; or of condensation products of phenols with formaldehyde obtained under acid conditions, such as phenol/novolaks and cresol/novolaks; di- or poly($\beta$-methylglycidyl)-ethers of the above mentioned polyvalent alcohols or polyvalent phenols; polyglycidyl esters of polyvalent carboxylic acids such as phthalic acid, terephthalic acid, $\Delta^4$-tetrahydrophthalic acid and hexahydrophthalic acid; N-glycidyl derivatives of amines, amides and heterocyclic nitrogen bases such as N,N-diglycidylaniline, N,N-diglycidyl-toluidine, N,N,N',N'tetraglycidyl-bis-(p-aminophenyl)-methane; triglycidylisocyanurate; N,N'-diglycidylethyleneurea; N,N'-diglycidyl-5,5-dimethylhydantoin, N,N'-diglycidyl-5-isopropylhydantoin; N,N'diglycidyl-5,5-dimethyl-6-isopropyl-5,6-dihydrouracil, 1-glycidyloxymethyl-3-glycidyl-5,5-dimethyl-5,6-dihydrouracil, 1-glycidyl-3-($\beta$-glycidyloxyethyl)-5,5-dimethylhydantoin, bis-(3-glycidyl-5,5-dimethylhydantoinyl-1)-methane and 1,6-bis-(1'-glycidyl-5',5'-di-methylhydrantoinyl-3')-hexane.

Of the particularly suitable cycloaliphatic epoxide compounds, mention may be made, for example, of those compounds of the formulae:

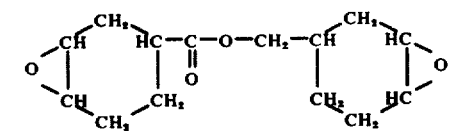 XXXIX ( = 3,4-epoxycyclohexylmethyl-3',4'-epoxycyclohexane-carboxylate),

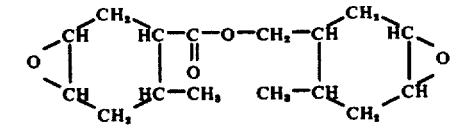 XL ( = 3,4-epoxy-6-methylcyclohexylmethyl-3',4'-epoxy-6'-methyl-cyclohexanecarboxylate), and

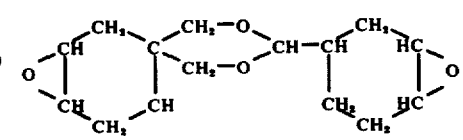 XLI

The epoxide compounds together with the stabiliser as defined above react with customary curing agents for polyepoxide compounds and can therefore be crosslinked or cured by addition of such curing agents, analogously to other polyfunctional epoxide compounds or epoxide resins. Possible curing agents of this nature are basic or acid compounds, especially anhydride compounds.

As examples of suitable curing agents there may be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis-(4-amino-3methyl-cyclohexyl)-methane, 3,5,5-trimethyl-3-(aminomethyl)-cyclohexylamine ("isophoronediamine"), Mannich bases, such as 2,4,6-tris-(dimethylaminomethyl)-phenol; m-phenylenediamine, p-phenylenediamine, bis-(4-aminophenyl)-methane, bis(4-aminophenyl)-sulphone and m-xylylenediamine; N-(2-aminoethyl)piperazine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine in excess, and polyepoxides, such as diomethanepolyglycidyl-esters; ketrimines, for example from acetone or methyl ethyl ketone and bis(p-amino-phenyl)-methane; adducts of monophenols or polyphenols and polyamines; polyamides, especially those from aliphatic polyamines, such as diethylenetriamine or triethylenetetramine, and dimerised or trimerised unsaturated fatty acids, such as dimerised linseed oil fatty acid (VERSAMID); polymeric polysulphides (THIOKOL); dicyandiamide, aniline-formaldehyde resins, polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, methyl-3,6-endomethylene-$\Delta^4$-tetrahydrophthalic anhydride (= methylnadic anhydride), 3,4,5,6,7,7-hexachloro-3,6-endomethylene-$\Delta^4$-tetrahydrophthalic anhydride, succinic anhydride, adipic anhydride, azelaic anhydride, sebacic anhydride, maleic anhydride, dodecenyl-succinic anhydride; pyromellitic dianhydride or mixtures of such anhydrides.

Of these curing agents the polybasic carboxylic acids and their anhydrides are especially suitable.

Curing accelerators can furthermore be employed in the curing reaction; when using polyamides, dicyandiamide, polymeric polysulphides or polycarboxylic acid anhydrides as curing agents, suitable accelerators are, for example, tertiary amines, their salts or quaternary ammonium compounds, for example 2,4,6-tris-(dimethylaminomethyl)-phenol, benzyldimethylamine, 2-ethyl-4-methyl-imidazole, 4-amino-pyridine and triamylammonium phenolate, and also alkali metal alcoholates, such as, for example, sodium hexanetriolate. In the amine curing reaction, monophenols or polyphenols, such as phenol or diomethane, salicylic acid or thiocyanates, can for example be employed as accelerators.

The term "curing" as used here denotes the conversion of the abovementioned diepoxides into insoluble and infusible, crosslinked products, and in particular, as a rule, with simultaneous shaping to give mouldings, such as castings, pressings or laminates and the like, or to give "sheet-like structures", such as coatings, coverings, lacquer films or the like.

Depending on the choice of the curing agent, the curing reaction can be carried out at room temperature, (18°–25° C) or at elevated temperature (for example 50°–180° C).

The curing can, if desired, also be carried out in 2 stages, by first prematurely stopping the curing reaction or carrying out the first stage at only moderately elevated temperature, whereby a still fusible and soluble, curable precondensate (a so-called "B-stage") is obtained from the epoxide component and the curing agent component. Such a precondensate can, for example, be used for the manufacture of "Prepregs", compression moulding compositions or sintering powders.

The polyepoxides stabilised as above or their mixtures with other polyepoxide compounds and/or curing agents can furthermore be mixed, in any stage before curing, with customary modifiers, such as extenders, fillers and reinforcing agents, pigments, dyestuffs, organic solvents, plasticisers, flow control agents, agents for conferring thixotropy, flameproofing substances and mould release agents.

As extenders, reinforcing agents, fillers and pigments which can be employed in the curable mixtures according to the invention there may, for example, be mentioned: coal tar, bitumen, texitle fibres, glass fibres, asbestos fibres, boron fibres, carbon fibres, cellulose, polyethylene powder and polypropylene powder; quartz powder; mineral silicates, such as mica, asbestos powder and slate powder; kaolin, aluminium oxide trihydrate, chalk powder, gypsum, antimony trioxide, bentones, silica aerogel (AEROSIL), lithopone; baryte, titanium dioxide, carbon black, graphite, oxide pigments, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

As plasticisers for modifying the curable mixtures, dibutyl phthalate, dioctyl phthalate and dinonyl phthalate, tricresyl phosphate, trixylenyl phosphate and also polypropylene glycol can, for example, be employed.

As flow control agents when employing the curable mixtures, especially in surface protection, silicones, cellulose acetobutyrate, polyvinylbutyral, waxes, stearates and the like (which in part are also used as mould release agents) may, for example, be added.

Particularly for use in the lacquer field, the diepoxide compounds can furthermore be partially esterified in a known manner with carboxylic acids such as, in particular, higher unsaturated fatty acids. It is furthermore possible to add other curable synthetic resins, for example phenoplasts or aminoplasts, to such lacquer resin formulations.

The curable mixtures according to the invention can be manufactured in the usual manner, with the aid of known mixing equipment (stirrers, kneaders, rolls and the like).

The amine stabilisers are added to the carrier materials in a concentration of 0.01–10% by weight, based on the carrier material. Preferably, 0.05–4%, and particularly preferentially 0.05–2.5%, are added.

Further possible additives which are added, conjointly with the amine stabiliser, to the epoxide compounds, are: antistatic agents, lubricants, pigments, flammeproofing agents, blowing agents, fillers and antioxidants, preferably phenolic antiodidants, as well as other light stabilisers, such as UV-absorbers, as well as phosphites.

Suitable co-stabilisers are e.g. light stabilisers of the benzoat type, such as 3,5-Di-tert.-butyl-4hydroxy-benzoic acid esters of alkanols or optionally alkylated phenols, such as of 2,4-di-tert.-butyl-phenol or 2,4,6-tritert.-butyl-phenol, or compounds of the formula

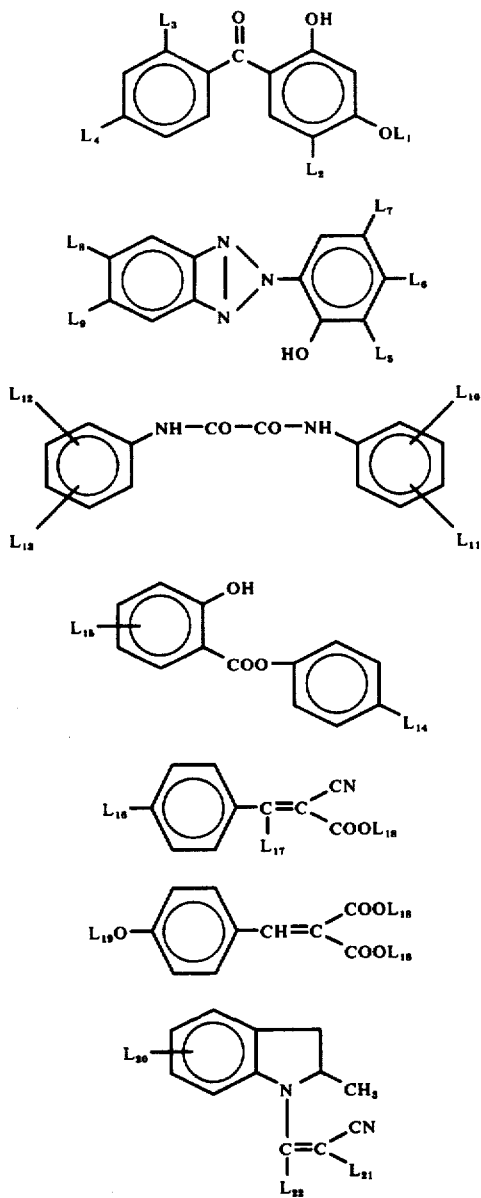

wherein $L_1$ denotes hydrogen, alkyl, alkenyl or aralkyl, $L_2$ denotes hydrogen, alkyl or chlorine, $L_3$ denotes hydrogen, hydroxyl, carboxyl, alkoxy or alkyl, $L_4$ denotes hydrogen, hydroxyl, alkoxy, alkenyloxy, aralkoxy or alkyl, $L_5$ denotes hydrogen, alkyl, alkenyl, cycloalkyl, aralkyl, aryl, acylamino, acylaminoalkyl or halogen, $L_6$ denotes hydrogen, alkyl, hydroxyl, alkoxy or acylamino, $L_7$ denotes hydrogen, alkyl, alkenyl, cycloalkyl, aralkyl, aryl, alkoxy, halogen, carboxyl, alkoxycarbonyl, alkoxycarbonylalkyl or acylamino, $L_8$ denotes hydrogen, alkyl, hydroxyl, alkoxy, halogen, acylamino, carboxyl, alkoxycarbonyl, acyloxy, carbamoyl, alkoxysulphonyl, aryloxysulphonyl or sulphonamido, $L_9$ denotes hydrogen, alkyl or halogen, $L_{10}$ and $L_{12}$ independently of one another denote hydrogen, alkyl, alkoxy, alkenyloxy, aralkoxy, aryloxy, halogen or alkoxycarbonyl, $L_{11}$ and $L_{13}$ independently of one another denote hydrogen or alkyl, $L_{14}$ and $L_{15}$ independently of one another denote hydrogen, alkyl, cycloalkyl or aralkyl, $L_{16}$ denotes hydrogen, alkoxy or aralkoxy, $L_{17}$ denotes alkyl or aryl, $L_{18}$ denotes alkyl, cycloalkyl or aralkyl, $L_{19}$ denotes alkyl or aralkyl, $L_{20}$ denotes hydrogen, alkyl, alkoxy or halogen, $L_{21}$ denotes nitrile or alkoxycarbonyl and $L_{22}$ denotes hydrogen or alkyl.

Preferably, $L_1$ denotes hydrogen, alkyl with 1-18 carbon atoms, allyl, methallyl or benzyl, $L_2$ denotes hydrogen, $L_3$ denotes hydrogen or hydroxyl, $L_4$ denotes hydrogen, hydroxyl, alkoxy with 1-20 carbon atoms, allyloxy, methallyloxy or benzyloxy, $L_5$ denotes hydrogen, alkyl with 1-12 carbon atoms, alkenyl with 3-12 carbon atoms, cyclohexyl, aralkyl with 7-11 carbon atoms, phenyl, acylamino with 2-12 carbon atoms, acylaminomethyl with 3-13 carbon atoms, chlorine or bromine, $L_6$ denotes hydrogen, methyl, hydroxyl, alkoxy with 1-12 carbon atoms or acylamino with 2-12 carbon atoms, $L_7$ denotes hydrogen, alkyl with 1-12 carbon atoms, aralkyl with 7-11 carbon atoms, cyclohexyl, phenyl, alkoxycarbonylethyl with 4-15 carbon atoms, alkoxy with 1-12 carbon atoms, chlorine, bromine, carboxyl, alkoxycarbonyl with 2-13 carbon atoms or acylamino with 2-12 carbon atoms, $L_8$ denotes hydrogen, alkyl with 1-8 carbon atoms, alkoxy with 1-12 carbon atoms, chlorine, bromine, acylamino with 2-12 carbon atoms, carboxyl, alkoxycarbonyl with 2-13 carbon atoms, acyloxy with 2-12 carbon atoms, carbamoyl with 3-17 carbon atoms, alkoxysulphonyl with 1-12 carbon atoms, phenoxysulphonyl or sulphonamido with 2-16 carbon atoms, $L_9$ denotes hydrogen, methyl, chlorine or bromine, $L_{10}$ and $L_{12}$ independently of one another denote alkyl with 1-8 carbon atoms, alkoxy with 1-12 carbon atoms, allyloxy, methallyloxy, phenoxy, benzyloxy, chlorine, bromine or alkoxycarbonyl with 2-13 carbon atoms, $L_{11}$ and $L_{13}$ independently of one another denote hydrogen or alkyl with 1-8 carbon atoms, $L_{14}$ and $L_{15}$ independently of one another denote hydrogen or alkyl with 1-12 carbon atoms, $L_{16}$ denotes alkoxy with 1-12 carbon atoms, $L_{17}$ denotes alkyl with 1-3 carbon atoms or phenyl, $L_{18}$ denotes alkyl with 1-12 carbon atoms, $L_{19}$ denotes alkyl with 1-12 carbon atoms, $L_{20}$ denotes hydrogen, alkyl with 1-8 carbon atoms, alkoxy with 1-8 carbon atoms or chlorine, $L_{21}$ denotes nitrile or alkoxycarbonyl with 2-20 carbon atoms and $L_{22}$ denotes hydrogen or alkyl with 1-3 carbon atoms.

Most preferably, $L_1$ denotes hydrogen, alkyl with 1-12 carbon atoms or benzyl, $L_2$ denotes hydrogen, $L_3$ denotes hydrogen or hydroxyl, $L_4$ denotes hydrogen, hydroxyl or alkoxy with 1-12 carbon atoms, $L_5$ denotes hydrogen, alkyl with 1-8 carbon atoms, allyl, methallyl, phenyl, benzyl, α-phenethyl, α-phenylisopropyl, acylaminomethyl with 3-9 carbon atoms or chlorine, $L_6$ denotes hydrogen, methyl, hydroxyl or alkoxy with 1-8 carbon atoms, $L_7$ denotes hydrogen, alkyl with 1-8 carbon atoms, cyclohexyl, phenyl, benzyl, α-phenethyl, α-phenylisopropyl or chlorine, $L_8$ denotes hydrogen, methyl or chlorine, $L_9$ denotes hydrogen, $L_{10}$ and $L_{12}$ independently of one another denote alkyl with 1-4 carbon atoms, alkoxy with 1-8 carbon atoms or chlorine, $L_{11}$ and $L_{13}$ independently of one another denote hydrogen or alkyl with 1-4 carbon atoms, $L_{14}$ denotes hydrogen or alkyl with 1-8 carbon atoms, $L_{15}$ denotes hydrogen, $L_{16}$ denotes alkoxy with 1-4 carbon atoms, $L_{17}$ denotes methyl or phenyl, $L_{18}$ denotes alkyl with 1-8 carbon atoms, $L_{19}$ denotes alkyl with 1-4 carbon atoms, $L_{20}$ denotes hydrogen, $L_{21}$ denotes alkoxycarbonyl with 2-5 carbon atoms and $L_{22}$ denotes hydrogen.

The residues have preferably the above mentioned meaning.

Examples of compounds of the formula XLII are:
II. 1. 2,4-Dihydroxy-,
II. 2. 2-Hydroxy-4-methoxy-,
II. 3. 2-Hydroxy-4-octoxy-
II. 4. 2-Hydroxy-4-dodecyloxy-,
II. 5. 2-Hydroxy-4-benzyloxy-,
II. 6. 2-Hydroxy-4,4'-dimethoxy-,
II. 7. 2,4,4'-trihydroxy-,
II. 8. 2,2'-Dihydroxy-4,4'-dimethoxy-,
II. 9. 2,2',4,4'-Tetrahydroxy-,
II. 10. 2,2'-Dihydroxy-4-methoxy-,
II. 11. 2-Hydroxy-2'-carboxy-4-methoxy-,
II. 12. 2,2'-Dihydroxy-4-octoxy- and
II. 13. 2,2'-Dihydroxy-4-dodecyloxy-benzophenone.

Examples of compounds of the formula XLIII are:
III. 1. 2-(2'-Hydroxy-5'-methylphenyl)-,
III. 2. 2-(2'-Hydroxy-5'-tert.-butylphenyl)-,
III. 3. 2-(2'-Hydroxy-5'-tert.-octylphenyl)-,
III. 4. 2-(2'-Hydroxy-3'-tert.-butyl-5'-methylphenyl)-,
III. 5. 2-(2'-Hydroxy-3'-tert.-butyl-5'-methylphenyl)-5-chloro-
III. 6. 2-(2'-Hydroxy-3',5'-di-tert.-butylphenyl)-,
III. 7. 2-(2'-Hydroxy-3',5'-di-tert.-butylphenyl)-5-chloro-,
III. 8. 2-(2'-Hydroxy-3',5'-di-tert.-amylphenyl)-,
III. 9. 2-(2'-Hydroxy-3',5'-di-tert.-amylphenyl)-5-chloro-,
III. 10. 2-(2'-Hydroxy-3'-sec.-butyl-5'-tert.-butylphenyl)-,
III. 11. 2-(2'-Hydroxy-3'-tert.-butyl-5'-sec.-butylphenyl)-,
III. 12. 2-(2',4'-Dihydroxyphenyl)-,
III. 13. 2-(2'-Hydroxy-4'-methoxyphenyl)-,
III. 14. 2-(2'-Hydroxy-4'-octoxyphenyl)-,
III. 15. 2-(2'-Hydroxy-3'-α-phenylethyl-5'-methylphenyl)- and
III. 16. 2-(2'-Hydroxy-3'-α-phenylethyl-5'-methylphenyl)-5-chloro-benztriazole.

Examples of compounds of the formula XLIV are:
IV. 1. 2-Ethyl-2'-ethoxy-,
IV. 2. 2-Ethyl-2'-ethoxy-5'-tert.-butyl-,
IV. 3. 2-Ethyl-4-tert.-butyl-2'-ethoxy-5'-tert.-butyl-,
IV. 4. 2,2'-Dimethoxy-,
IV. 5. 2,2'-Diethoxy-,
IV. 6. 4,4'-Dimethoxy-,
IV. 7. 4,4'-Diethoxy-,
IV. 8. 2,4'-Dimethoxy-,
IV. 9. 2,4'-Diethoxy-,
IV. 10. 2-Methoxy-2'-ethoxy-,
IV. 11. 2-Methoxy-4'-ethoxy-,
IV. 12. 2-Ethoxy-4'-methoxy-,
IV. 13. 2,2'-Dioctoxy-5,5'-di-tert.-butyl-,
IV. 14. 2,2'-Didodecyloxy-5,5'-di-tert.-butyl-,
IV. 15. 2-Ethyl-2'-octoxy-,
IV. 16. 4,4'-Di-octoxy-,
IV. 17. 2-Ethyl-2'-butoxy- and
IV. 18. 4-Methyl-4'-methoxy-oxalanilide.

Examples of compounds of the formula XLV are:
V. 1. Salicylic acid phenyl ester.
V. 2. Salicylic acid 4-tert.-butylphenyl ester.
V. 3. Salicylic acid 4-tert.-octylphenyl ester.

Examples of compounds of the formula XLYI are:
VI. 1. α-Cyano-β-methyl-4-methoxycinnamic acid methyl ester.
VI. 2. α-Cyano-β-methyl-4-methoxycinnamic acid butyl ester.
VI. 3. α-Cyano-β-phenyl-cinnamic acid ethyl ester.
VI. 4. α-Cyano-β-phenyl-cinnamic acid isooctyl ester.

Examples of compounds of the formula XLVII are:
VII. 1. 4-Methoxy-benzylidenemalonic acid dimethyl ester.
VII. 2. 4-Methoxy-benzylidenemalonic acid diethyl ester.
VII. 3. 4-Butoxy-benzylidenemalonic acid dimethyl ester.

Examples of compounds of the formula XLVIII are:
VIII. 1. N-(β-Cyano-β-carbomethoxyvinyl)-2-methylindoline.
VIII. 2. N-(β-Cyano-β-carbooctoxyvinyl)-2-methylindoline.
VIII. 3. N-(β-Cyano-β-carbethoxyvinyl)-2-methylindoline.
VIII. 4. N-(β-Cyano-β-carboisooctoxyvinyl)-2-methylindoline.

The manufacture of most of the above compounds is known from the literature.

Compounds of the formula I can be manufactured according to F. Asinger, Monatshefte 99, 1436–1451 (1968), German Offenlegungschriften 2,040,975, 2,118,298, 2,128,757, 2,146,692 and 2,203,447, U.S. Pat. Nos. 3,513,170, 3,639,409, 3,640,928 and 3,663,558, British Pat. Nos. 1,196,958, 1,202,299 and 1,262,234, Belgian Pat. Nos. 778,381 and 778,676 and Japanese Pat. No. 600,043.

Further compounds of the formula I can be manufactured as follows:

Compounds of the general formula XV by condensation of the corresponding 4-aminopiperidines with aldehydes or ketones, according to known methods;

compounds of the general formula XVI by condensation of the corresponding 4-piperidinones with cyanoacetic acid or its esters by the Knoevenagel method, decarboxylation, catalytic hydrogenation of the unsaturated nitrile and alkylation or acylation of the resulting primary amine;

compounds of the general formula VI by oximation of the corresponding 4-piperidinones and optionally subsequent alkylation or acylation according to known methods;

compounds of the general formulae XII (B) and XIII (A) by condensation of the corresponding 4-piperidinones with phenols in the presence of acid catalysts to give compounds of the formula A and subsequent catalytic hydrogenation to give compounds of the formula B;

compounds of the general formulae XXIII(C) and XXIV(D) by condensation of the corresponding aminocyanohydrins according to R. Sudo, Bull. Chem. Soc. Japan 36, 34 (1963), subsequent hydrolysis according to E. F. J. Duynstee, Rec. 87, 945 (1968) and optional alkylation to give compounds of the formula C which can in turn be reduced with lithium aluminum hydride to give compounds of the formula D.

Compounds of formulae XLII–XLVIII can be manufactured according to U.S. Pat. Nos. 3,006,959 and 3,043,797, Swiss Pat. No. 355,947, British Pat. No. 1,177,095, French Pat. No. 1,318,102, German Auslegeschrift 1,087,902 and Netherlands Patent Application No. 67/08,332.

EXAMPLE 1

50 parts of a bisphenol A-epoxide resin which is liquid at room temperature, with an epoxide equivalent weight of 175 – 200 and which was manufactured by condensation of epichlorohydrin with bis-(p-hydroxyphenyl)-diphenylmethane in the presence of alkali (formula below, where n has a value of about 0,2)

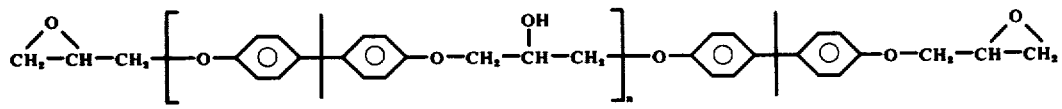

and 17 parts of bis-(4-amino-3-methylcyclohexyl)-methane were thoroughly mixed, after which 33 parts of titanium dioxide were added, 0.66 parts of one of the stabilizers of the following table were dissolved in 6.6 parts of Xylene and stirred into the mixture.

The compositions were then spread onto 10×15 cm steel plates and cured in an over during 5 hours at 40° C and subsequently during 2 weeks at 20° C.

The thus coated plates were then weathered artificially in a Weatherometer and the chalking of the surface caused by weathering is recorded periodically. A coating with no incorporated stabilizer is used for comparison purposes. For the rating of chalking an empirical scale is used in which the meanings of the figures are as follows:

| | |
|---|---|
| 0 | No chalking |
| 1 | Trace chalking |
| 2 | Moderate chalking |
| 3 | Very severe chalking |

| Stabilizer | Chalking ratings after hours of weathering | | | | | |
|---|---|---|---|---|---|---|
| | 300 | 400 | 500 | 850 | 1000 | 1250 |
| None | 0 | 1–2 | 2 | 2 | 2–3 | 3 |
| A | 0 | 0 | 0 | 1–2 | 1–2 | 2 |
| B | 0 | 0 | 0 | 1–2 | 2 | 2–3 |

Stabilizer A: N-Cyclohexyl-(2,2,6,6-tetramethylpiperidinyl-4)-acetamide
Stabilizer B: N-Cyclohexyl-(1,2,2,6,6-pentamethylpiperidinyl-4)-acetamide.

EXAMPLE 2

54 parts of a bisphenol A-epoxide resin which is solid at room temperature, with an epoxide equivalent weight of 870 – 1020 and which was manufactured by condensation of epichlorohydrin with bis-(p-hydroxyphenyl)-diphenylmethane in the presence of alkali (as a Xylene-Butyl acetate solution, formula below, where n has a value of about 6)

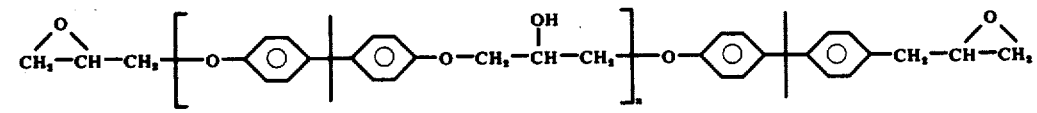

were pigmented by adding 35 parts of titanium dioxide, after which 16 parts of Hexahydrophthalic anhydride were added, 0.66 parts of one of the stabilizers of the following table were dissolved in the above mixture.

The compositions were than brushed onto 10×15 cm steel plates and cured in an oven during one hour at 120° and subsequently during 15 Minutes at 170° C.

The thus coated plates were then weathered artificially in a Weatherometer and the chalking of the surface caused by weathering is recorded periodically. A coating with no incorporated stabilizer is used for comparison purposes. For the rating of chalking an empirical scale is used in which the meanings of the figures are as follows:

| | |
|---|---|
| 0 | No chalking |
| 1 | Trace chalking |
| 2 | Moderate chalking |
| 3 | Very severe chalking |

| Stabilizer | Chalking ratings after hours of artificial weathering | | | | | | | | |
|---|---|---|---|---|---|---|---|---|---|
| | 300 | 400 | 500 | 850 | 1000 | 1250 | 1500 | 1750 | 2000 |
| None | 0 | 0 | 0 | 0 | 0 | 1 | 1–2 | 2 | 2–3 |
| A | 0 | 0 | 0 | 0 | 0 | 0 | 0 | 0 | 1 |
| B | 0 | 0 | 0 | 0 | 0 | 0 | 0 | 0 | 0 |
| C | 0 | 0 | 0 | 0 | 0 | 0 | 0 | 0 | 1 |
| D | 0 | 0 | 0 | 0 | 0 | 0 | 0 | 1 | 2 |

Stabilizer A: N-Cyclohexyl-(2,2,6,6-tetramethylpiperidinyl-4)-acetamide
Stabilizer B: N-Cyclohexyl-(1,2,2,6,6-pentamethylpiperidinyl-4)-acetamide
Stabilizer C: 3-n-Octyl-7,7,9,9-tetramethyl-1,3,8-triaza-spiro[4,5]decan-2,4-dion
Stabilizer D: 1-Chloro-3,5-Bis-(2,2,6,6-tetramethylpiperidinyl-amino-4(-S-triazine.

At the same time, the plates were exposed to natural weathering, 45° South, in Manchester, England, and the degree of chalking of the surface recorded monthly. For the rating, the same empirical scale is used,

| Stabilizer | Chalking ratings after months of natural weathering | | | | | |
|---|---|---|---|---|---|---|
| | 2 | 4 | 6 | 8 | 10 | 12 |
| None | 0 | 0 | 1 | 2 | 2 | 3 |
| A | 0 | 0 | 0 | 0 | 1 | 1 |
| B | 0 | 0 | 0 | 0 | 1 | 1 |

EXAMPLE 3

50 parts of the diglycidly ether of 2.2-bis(4-hydroxycyclohexyl)-propane having formula:

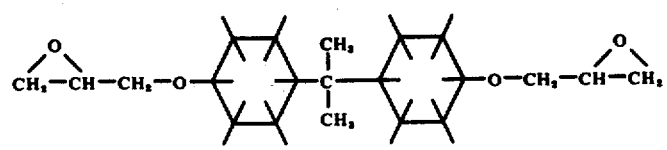

were pigmented by adding 42 parts of titanium dioxide after which 35 parts of Hexahydrophthalic anhydride were added, 0.85 parts of one of the stabilizers of the following table were dissolved in 8.5 parts of a Xylene-Butyl acetate mixture and added. The compositions were then spread onto 10×15 cm steel plates and cured in an oven during 1 hour at 120° C and subsequently during 15 minutes at 170° C.

The thus coated plates were then weathered artificially in a weatherometer and the chalking of the surface caused by weathering is recorded periodically. Coating with no incorporated stabilizer is used for comparison purpose. For the rating of chalking an empirical scale is used in which the meanings of the figures are as follows:

| | | |
|---|---|---|
| 0 | No chalking | |
| 1 | Trace chalking | |
| 2 | Moderate chalking | |
| 3 | Very severe chalking | |

| Stabilizer | Chalking ratings after hours of artifical weathering | | | | | | | | |
|---|---|---|---|---|---|---|---|---|---|
| | 300 | 400 | 500 | 850 | 1000 | 1250 | 1500 | 1750 | 2000 |
| None | 0 | 0 | 0 | 1 | 1 | 1-2 | 2-3 | 3 | 3 |
| A | 0 | 0 | 0 | 0 | 0 | 1 | 1 | 1 | 1-2 |
| B | 0 | 0 | 0 | 0 | 0 | 1 | 1 | 1 | 1 |

Stabilizer A: N-Cyclohexyl-(2,2,6,6-tetramethylpiperidinyl-4) acetamide
Stabilizer B: N-Cyclohexyl-(1,2,2,6,6-pentamethylpiperidinyl-4) acetamide At the same time, the plates were exposed to natural weathering, 45° South, in Manchester, England, and the degree of chalking of the surface recorded monthly. For the rating, the same empirical scale is used.

| Stabilizer | Chalking ratings after months of natural weathering | | | | |
|---|---|---|---|---|---|
| | 2 | 4 | 6 | 8 | 10 | 12 |
| None | 0 | 0 | 0 | 1 | 1 | 2 |
| A | 0 | 0 | 0 | 0 | 0 | 1 |
| B | 0 | 0 | 0 | 0 | 0 | 1 |

EXAMPLE 4

35 parts of a bisphenol A-epoxide resin which is solid at room temperature, with an epoxide equivalent weight of 1660 - 2000 and which was manufactured by condensation of epichlorohydrin with Bis-(p-hydroxyphenyl)-diphenylmethane in the presence of alkali (as a Xylene-Butyl acetate solution, formula below, where $n$ has a value of about 11)

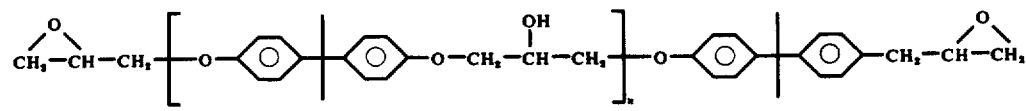

were pigmented by adding 40 parts of titanium dioxide after which 15 parts of a butylated melamine-formaldehyde resin were added. 0.5 parts of one of the stabilizers of the following table were dissolved in 5 parts of Xylene-Butylacetate mixture and added.

The compositions were then brushed onto 10 × 15 cm steel plates and cured in an oven during 1 hour at 180° C.

The thus coated plates were then exposed to natural weathering, 45° South, in Manchester, England, and the degree of chalking of the surface recorded monthly. A coating with no incorporated stabilizer is used for comparison purposes. For the rating of chalking an empirical scale is used, in which the meanings of the figures are as follows:

| | |
|---|---|
| 0 | no chalking |
| 1 | trace chalking |
| 2 | moderate chalking |
| 3 | very severe chalking |

| Stabilizer | Chalking ratings after months of natural weathering | | | | |
|---|---|---|---|---|---|
| | 2 | 4 | 6 | 8 | 10 |
| None | 0 | 1 | 1 | 1 | 2 |
| A | 0 | 0 | 0 | 1 | 1 |
| B | 0 | 0 | 0 | 1 | 1 |

Stabilizer A: N-Cyclohexyl-(2,2,6,6-tetramethylpiperidinyl-4) acetamide
Stabilizer B: N-Cyclohexyl-(1,2,2,6,6-pentamethylpiperidinyl-4) acetamide

We claim:
1. A method of stabilizing an epoxy resin by incorporating therein as a stabilizer substantially only at least one sterically hindered cyclic amine of the formula

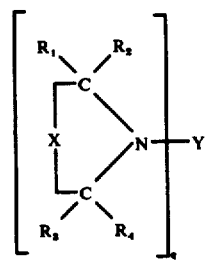

and salts thereof, wherein $q$ is 1 or 2, $X$ represents an organic grouping which complements the nitrogen-containing ring to give 5-membered, 6-membered or 7-membered ring, $R_1$ and $R_2$ represent methyl or together represent —$(CH_2)_5$—, $R_3$ represents methyl, $R_4$ represents alkyl with 1-5 carbon atoms or together with $R_3$ represents the radicals
—$(CH_2)_4$—, —$(CH_2)5$—, —$CH_2$—$C(CH_3)_2$—NH—$C(CH_3)_2$—$CH_2$—or —$CH_2$—$C(CH_3)_2$—N(O·)—$C(CH_3)_2$—$CH_2$—and, if $q$ is 1, $Y$ denotes hydrogen, —O·, hydroxyl, alkyl, substituted alkyl, alkenyl, alkynyl, aralkyl, substituted aralkyl or acyl or, if $q$ is 2, $Y$ denotes alkylene, alkenylene, alkynylene, cycloaklylene or aralkylene.

2. A method as claimed in claim 1, in which the sterically hindered amines of formula I correspond to the following formulae:

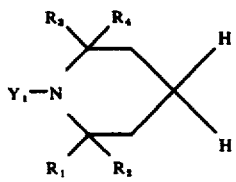

II

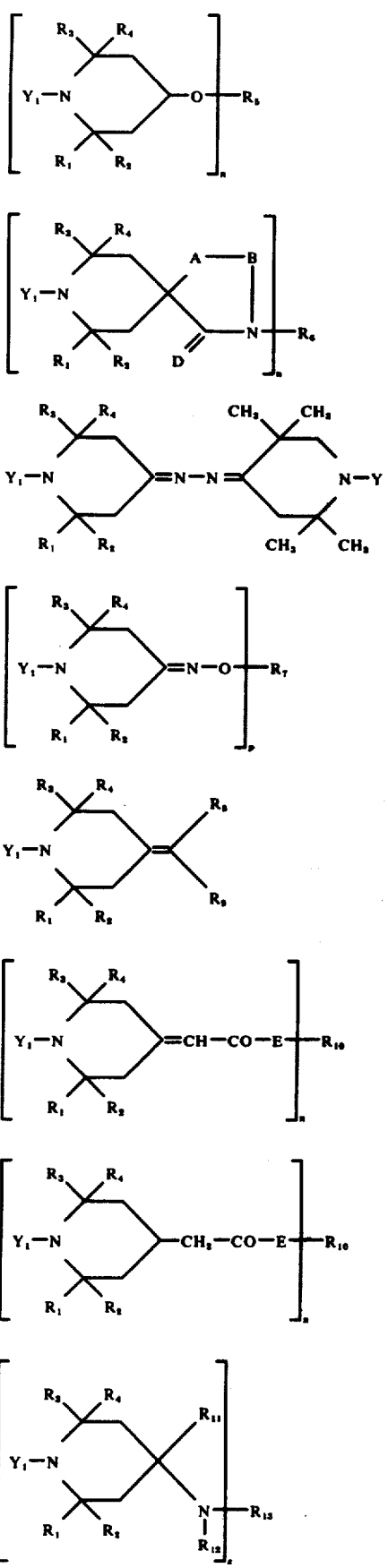
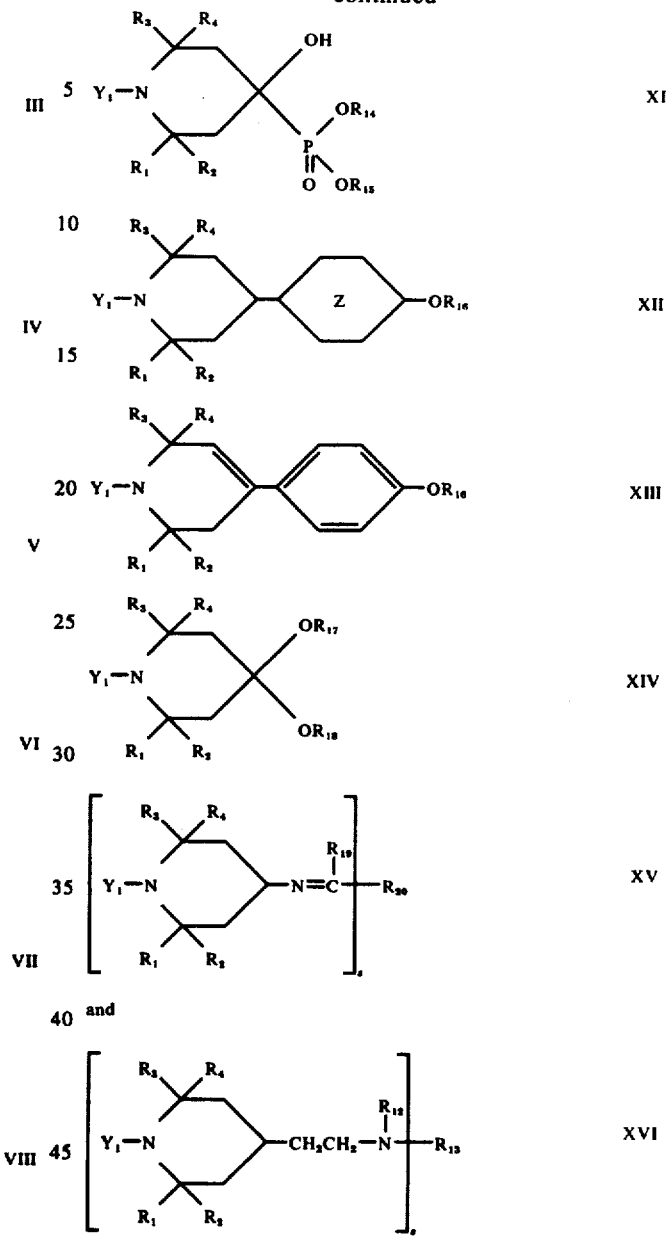

in which formulae $Y_1$ represents hydrogen —O·, hydroxyl, alkyl, substituted alkyl, alkenyl, alkinyl, aralkyl, substituted aralkyl or acyl, $R_1$ and $R_2$ represent methyl or together represent —$(CH_2)_5$—, $R_3$ represents methyl, $R_4$ represents alkyl with 1–5 carbon atoms or together with $R_3$ represents the radicals —$(CH_2)_4$—, —$(CH_2)_5$—, —$CH_2$—$C(CH_3)_2$—$NH$—$C(CH_3)_2$—$CH_2$— or —$CH_2$—$C(CH_3)_2$—$N(O·)$—$C(CH_3)_2$—$CH_2$—, $s$ represents 1, 2 or 3, $p$ represents 1 to 3, $n$ represents 1 to 4, $R_5$ represents hydroen, a saturated or unsaturated, unsubstituted or substituted aliphatic, cycloaliphatic or araliphatic radical, an unsubstituted or substituted aromatic radical, a monovalent to tetravalent acyl radical which is derived from an aliphatic, cycloaliphatic, araliphatic, aromatic or heterocyclic monobasic or polybasic carboxylic acid, from a carbonic acid or from a monobasic or polybasic phosphoric, suphuric, boric or silicic acid, and s-triazinyl radical or a group of the formula

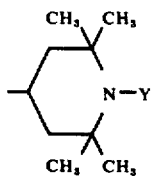 XVII

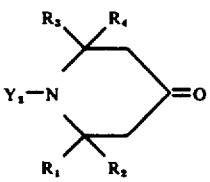 XIX

R₆ represents hydrogen, a saturated or unsaturated, unsubstituted or substituted aliphatic, cycloaliphatic or araliphatic radical, a substituted or unsubstituted aromatic radical, or a monoacyl radical derived from a monobasic carboxylic acid or carbonic acid, A represents oxygen or =N—R₂₄, wherein R₂₄ is hydrogen, alkyl, substituted alkyl, alkenyl, alkinyl or aralkyl, B represents >C=O, >C=S, alkylidene, substituted alkylidene or aralkylidene, D represents oxygen, sulphur or NH, R₇ represents hydrogen, alkyl, aralkyl or a monoacyl, diacyl or triacyl radical derived from a monobasic to tribasic carboxylic acid, or a carbonic acid radical, R₈ and R₉ independently of one another represent alkoxycarbonyl, acyl, nitrile or phenyl, R₁₀ represents a saturated or unsaturated, unsubstituted or substituted, aliphatic, cycloaliphatic or araliphatic radical, an unsubstituted or substituted aromatic radical or a group of the formula XVII, E represents oxygen, sulphur or >N—R₂₅, wherein R₁₅ is hydrogen, alkyl, cycloalkyl or aralkyl, R₁₁ represents hydrogen or alkyl, R₁₂ represents hydrogen, alkyl, cycloalkyl or aralkyl, R₁₃ represents hydrogen, a saturated or unsaturated, unsubstituted or substituted aliphatic, cycloaliphatic or araliphatic radical, an unsubstituted or substituted aromatic radical, a monovalent or divalent acyl radical derived from an aliphatic, cycloaliphatic, araliphatic, aromatic or heterocyclic monobasic or dibasic carboxylic acid, from a carbonic acid or from a monobasic or polybasic phosphoric acid or sulphuric acid, an s-triazinyl radical, a radical of the formula XVII or, together with R₁₂, an alkylene radical which can be interrupted by heteroatoms, R₁₄ and R₁₅ independently of one another represent alkyl, cycloalkyl or aralkyl or together represent alkylene, R₁₆ represents hydrogen or acyl, with the ring Z representing a benzene or cyclohexane ring which is unsubstituted or substituted by 1–3 alkyl, cycloalkyl or aralkyl groups, R₁₇ and R₁₈ represent the same alkyl group or together represent unsubstituted or substituted 1,2-ethylene, 1,3-propylene, 1,2-phenylene or a group of the formula

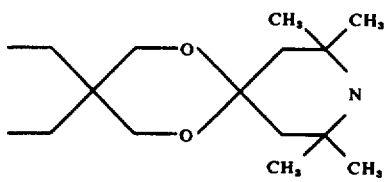 XVIII

R₁₉ represents hydrogen, alkyl, alkenyl, aralkyl, aryl or substituted aryl and R₂₀ represents unsubstituted or substituted alkyl, alkenyl, aralkyl, unsubstituted or substituted aryl, or a heterocyclic radical, or R₁₉ and R₂₀ together represent cycloalkylidene, or correspond to one of the following formulae:

XX

XXI

XXII

XXIII

XXIV

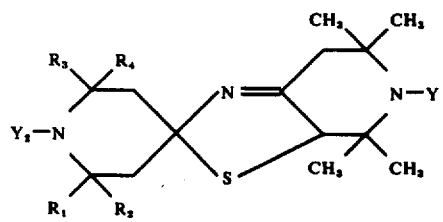 XXV

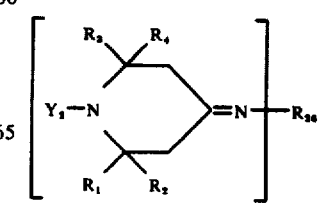 XXVI

-continued

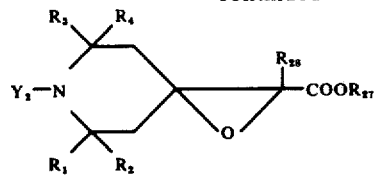   XXVII in which formulae $Y_2$ denotes hydrogen, $-O\cdot$ or methyl, $s$, $p$, $R_1$, $R_2$, $R_3$ and $R_4$ denote what has been mentioned above, $R_{21}$ denotes a monovalent or divalent acyl radical derived from a monobasic or dibasic carboxylic acid or carbonic acid, $R_{22}$ denotes hydrogen, alkyl, alkoxycarbonylalkyl, aralkyl, alkylene, aralkylene or arenetriyl-tris-alkyl, $R_{23}$ denotes the same as $R_{22}$ or denotes a monoacyl or diacyl radical or $-(CH_2)_{1-12}-COOMe$, Me being hydrogen or $Me^z$ $1/z$ and Me being a dialkyl tin residue or a metal residue and $z$ being 1-4 and the valence of that residue Me, $R_{26}$ denotes alkyl, cycloalky, aralkyl, aryl, arylamino, alkylene, cycloalkylene or arylene, $R_{27}$ denotes alkyl and $R_{28}$ denotes hydrogen or alkyl with 1-5 carbon atoms, or correspond to the formula

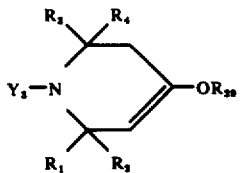   XXIX wherein $R_1$, $R_2$, $R_3$ and $R_4$ have the abovementioned meaning, $Y_3$ represents hydrogen or methyl and $R_{29}$ represents alkyl, cycloalkyl or aralkyl, Ya is for $w$ being 1 alkyl, substituted alkyl, alkenyl, alkinyl, aralkyl or substituted aralkyl, Ya is for $w$ being 2 alkylene, interrupted alkylene, alkenylene, alkinylene or bis-alkylene arene, Ya is for $w$ being 3 $T[OOC-(CH_2)_x-]_3$ with $x$ being 1-4 and T being a trivalent hydrocarbon residue, or Ya is for $w$ being 4 $Q[OOC-(CH_2)_x-]_4$ with $x$ being 1-4 and Q being a tetravalent hydrocarbon residue, or in a compound XX Ya is $-CO-Xxx-Rxx$, $Xxx$ being O or NH and $Rxx$ being a hydrocarbyl residue having from 1-20 C-atoms and $w$ is 1 or 2 or corresponds to the formula

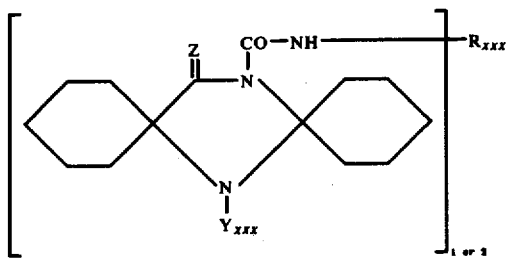   XXX as well as salts thereof, wherein $Yxxx$ is $O\cdot$, hydrogen or alkyl with 1-4 carbon atoms, $Rxxx$ is optionally substituted hydrocarbyl residue with 1-20 carbon atoms and Z is S or preferably O, or corresponds to the formula

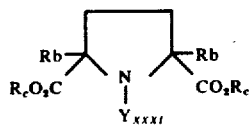   XXXI wherein $Y_{xxxi}$ is hydrogen, hydroxy, $O\cdot$, alkyl, alkenyl, alkinyl or alkoxyalkyl, $R_b$ is alkyl and $R_c$ is alkyl or phenethyl, or corresponds to the formula

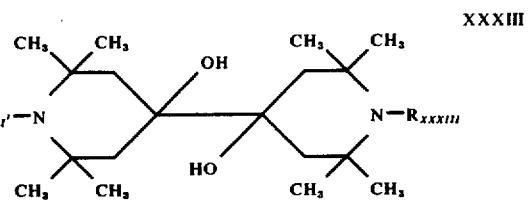   XXXIII $R_{xxxiii}$ and $R_{xxxiii}$ being same or different and each hydrogen, alkyl, alkenyl, alkinyl, aralkyl, hydroxyalkyl, alkoxyalkyl, aliphatic or aromatic acyloxyalkyl, cyanoalkyl, halogenoalkyl, epoxyalkyl, alkoxycarbonylalkyl, aliphatic acyl, alkoxycarbonyl or aralkoxycarbonyl, or corresponds to the formula

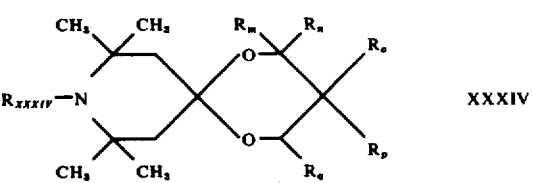   XXXIV $Rxxx$ being same as $Rxxx$ and $R_m$, $R_n$, $R_o$, $R_p$ and $R_q$ being same or different and hydrogen or alkyl.

3. A method as claimed in claim 2, in which in the formulae given for sterically hindered cyclic amines and in the formulae II-VIII, $Y_1$ denotes hydrogen, $-O\cdot$ or methyl, $R_1$, $R_2$, $R_3$ and $R_4$ denote methyl, as denotes 1, $p$ denotes 1, $n$ denotes 1 or 2, $R_5$ denotes hydrogen, or an acyl group which is derived from an aliphatic carboxylic acid with 1-18 carbon atoms, from acrylic acid or methacrylic acid, from benzoic acid or from an alkylbenzoic acid with 8-11 carbon atoms, from salicylic acid, from an aliphatic dicarboxylic acid with 4-14 carbon atoms, from terephthalic acid, from isophthalic acid or from a carbamic or thiocarbamic acid which is substituted at the nitrogen by alkyl with 1-12 carbon atoms, benzyl or phenyl, $R_6$ denotes alkyl with 1-12 carbon atoms, allyl, benzyl, cyclohexyl, glycidyl, hydroxyethyl, alkoxyalkyl with 3-10 carbon atoms, alkoxycarbonylalkyl with 3-14 carbon atoms, hexamethylene or 3-oxapentamethylene, A denotes >NH or >N-$R_{24}$, wherein $R_{24}$ is hydrogen, methyl, ethyl or benzyl, B denotes >C=O, D denotes oxygen, $R_7$ denotes hydrogen, methyl, benzyl, benzoyl or phenylcarbamoyl, $R_8$ denotes nitrile, $R_9$ denotes ethoxycarbonyl, phenyl or benzoyl, $R_{10}$ denotes alkyl with 6-8 carbon atoms, cyclohexyl, benzyl, alkylene with 4-12 carbon atoms, xylyene, phenylene or 2,2,6,6,-tetramethyl-piperidinyl-4, E denotes oxygen or >NH, $R_{11}$ denotes hydrogen, $R_{12}$ denotes hydrogen or methyl, $R_{13}$ hydrogen or an acyl group which is derived from an aliphatic carboxylic acid 1-18 carbon atoms, from acrylic or methacrylic acid, from a benzoic acid with 7-10 carbon atoms, from salicylic acid or from a carbamic or thiocarbamic acid which is substituted at the nitrogen by alkyl with 1-12 carbon atoms, benzyl or phenyl, $R_{14}$ and $R_{15}$ denote alkyl with 4-8 carbon atoms, benzyl or chloroethyl, $R_{16}$ denotes hydrogen or the radical of an acyl group which is derived from an aliphatic carboxylic acid with 2-12 carbon atoms, from benzoic acid or from a N-alkyl-carbamic acid with 2-8carbon atoms, with the ring Z representing a benzene ring which is substituted further by 1-2 methyl, isopropyl or tert.-butyl groups, $R_{17}$ and $R_{18}$ denote methyl, ethylene, 1,3-propylene or a group of the formula XXXV, $R_{19}$ denotes hydrogen, $R_{20}$ denotes alkyl with 1-8 carbon atoms, benzyl, phenyl, alkoxyphenyl with 7-10 carbon atoms, or together with $R_{19}$, $-(CH_2)_5-$, $R_{21}$ denotes an acyl group which is derived from an aliphatic monocarboxylic acid with 3-18 carbon atoms of which the chain can be interrupted by sulphur atoms, from phenylacetic acid, from benzoic acid or from salicylic acid, $R_{22}$ denotes hydrogen, alkyl with 6-18 carbon atoms or benzyl, $R_{23}$ denotes the same as $R_{22}$ or an acyl group which is derived from an aliphatic carboxylic acid with 3-18 carbon atoms, from benzoic acid or from a carbamic acid which is substituted at the nitrogen by alkyl with 1-12 carbon atoms or phenyl, $R_{24}$ denotes hydrogen, methyl, ethyl or benzyl, $R_{25}$ denotes alkyl with 4-18 carbon atoms, benzyl or phenyl, $R_{27}$ denotes alkyl with 1-4 carbon atoms, $R_{28}$ denotes hydrogen, $R_{29}$ denotes alkyl with 4-18 carbon atoms or benzyl.

4. A method as claimed in claim 1, containing sterically indered cyclic amines of the formula

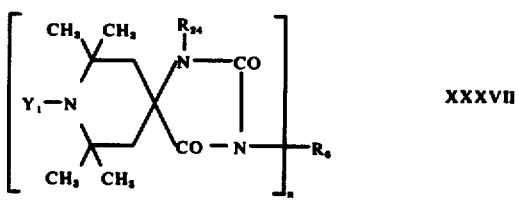

XXXVII in which $Y_1$ denotes hydrogen, $-O\cdot$ methyl, $R_6$ denotes alkyl with 1-12 carbon atoms, allyl, benzyl, cyclohexyl, glycidyl, hydroxyethyl, alkoxyalkyl with 3-10 carbon atoms, alkoxycarbonylalkyl with 3-14 carbon atoms, hexamethylene or 3-oxapentamethylene, $R_{34}$ denotes hydrogen, methyl, ethyl or benzyl, and $n$ denotes 1 or 2, or of the formula

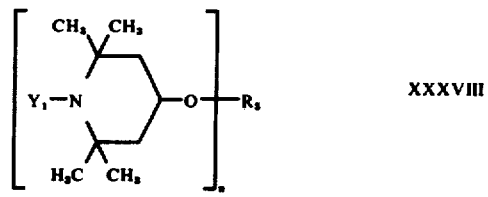

XXXVIII in which $Y_1$ denotes hydrogen, $-O\cdot$ or methyl, $R_5$ denotes an acyl group which is derived from an aliphatic carboxylic acid with 1-18 carbon atoms, from acrylic acid or methacrylic acid, from a benzoic acid with 7-11 carbon atoms, from salicylic acid, from an aliphatic dicarboxylic acid with 6-14 carbon atoms, from terephthalic acid, from isophthalic acid, from $\beta$-(3,5-di-tert.-butyl-4-hydroxyphenyl)-propionic acid or from 3,5-di-tert.-butyl-4-hydroxy-benzoic acid and $n$ denotes 1 or 2. $R_5$ also denotes an s-triazinyl radical which has a chlorine substituent and $n$ is 2.

5. A method as claimed in claim 4, wherein $R_5$ also denotes a s-triazinyl radical which has a chlorine substituent and $n$ is 2.

6. A method as claimed in claim 1, derived from epoxy compounds containing more than one epoxide group.

7. A method as claimed in claim 1, wherein the amine stabilisers are added to the carrier materials in a concentration of 0.01-10% by weight, based on the carrier material.

8. A method as claimed in claim 1, wherein the amine stabilisers are added to the carrier materials in concentrations of 0.05-2.5%, based on the carrier material.

9. A method as claimed in claim 1, containing as further additives antistatic agents, lubricants, pigments, flameproofing agents, blowing agents, fillers and antioxidants, preferably phenolic antioxidants, UV-absorbers and/or phosphites.

* * * * *